United States Patent [19]

Kubota

[11] 4,255,768
[45] Mar. 10, 1981

[54] TRACKING CONTROL APPARATUS FOR A ROTARY HEAD, VARIABLE SPEED SIGNAL REPRODUCING SYSTEM

[75] Inventor: Yukio Kubota, Takaidonishi, Japan

[73] Assignee: Sony Corporation, Tokyo, Japan

[21] Appl. No.: 75,516

[22] Filed: Sep. 13, 1979

[30] Foreign Application Priority Data

Sep. 14, 1978 [JP] Japan ................................. 53-113445

[51] Int. Cl.³ ...................... G11B 21/10; G11B 21/08; H04N 5/78
[52] U.S. Cl. ...................................... 360/10; 360/11; 360/76; 360/77; 360/78
[58] Field of Search ....................... 360/10, 11, 70, 75, 360/76, 77, 78

[56] References Cited

U.S. PATENT DOCUMENTS

| 3,845,500 | 10/1974 | Hart ........................................ 360/77 |
| 4,143,405 | 3/1979 | Kubota ................................... 360/10 |
| 4,167,763 | 9/1979 | Kubota ................................... 360/77 |
| 4,189,758 | 2/1980 | Morio et al. ........................... 360/77 |

Primary Examiner—Bernard Konick
Assistant Examiner—Donald McElheny, Jr.
Attorney, Agent, or Firm—Lewis H. Eslinger; Alvin Sinderbrand

[57] ABSTRACT

The present invention is intended for use in a signal reproducing system of the type having at least one rotary transducer for scanning traces across a movable record medium, such as a magnetic tape, to reproduce signals from previously recorded record tracks. Each transducer is supported on a displaceable support member that is responsive to control signals to displace the transducer relative to the record tracks. The record medium is movable at a speed which may be less than, equal to or greater than the speed at which the signals originally were recorded. A frequency generator generates speed representing pulses whose frequency is a function of the speed at which the record medium is moved. A cyclical, or resettable, counter cyclically counts the speed representing pulses. A level generator generates a signal level corresponding to the count then present in the counter at the time that a transducer advances to the middle portion of a scanning trace. The generated signal level is used as a control signal to correspondingly displace the transducer support member. This displacement provides general compensation for the deviation between the scanning trace of the transducer and the record track which is scanned thereby. In a preferred use of the present invention, the signal reproducing system is a VTR, and tracking compensation is provided for slow or fast modes of reproduction. In accordance with another feature, a sawtooth signal having a period equal to a head scanning period, and an amplitude determined by the speed at which the record medium (or tape) is moved is added to the generated level in order to provide substantially continuous error correction of the head scanning trace.

32 Claims, 64 Drawing Figures

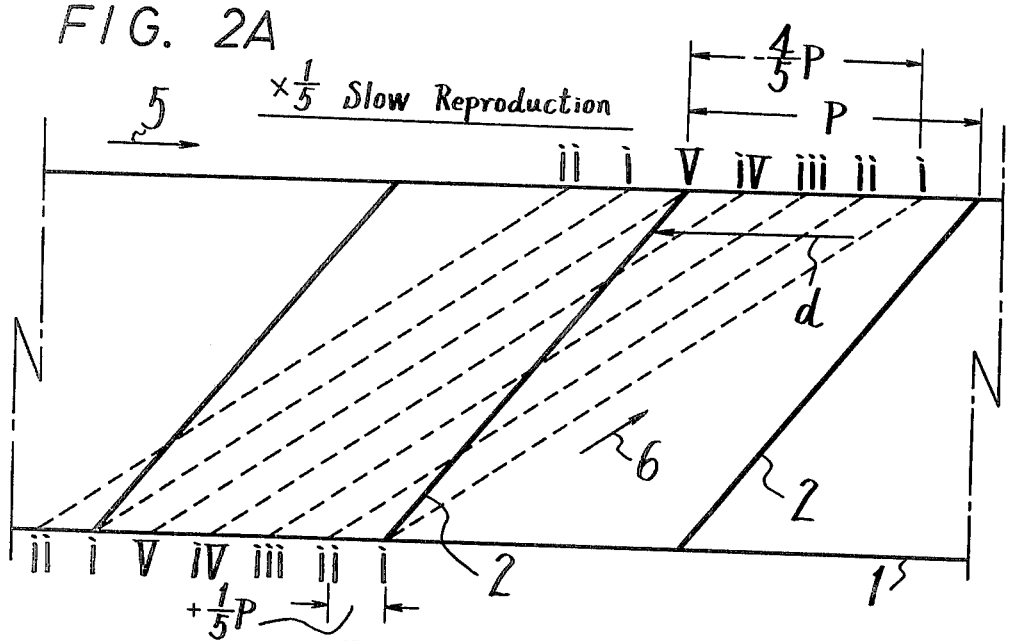
FIG. 2A
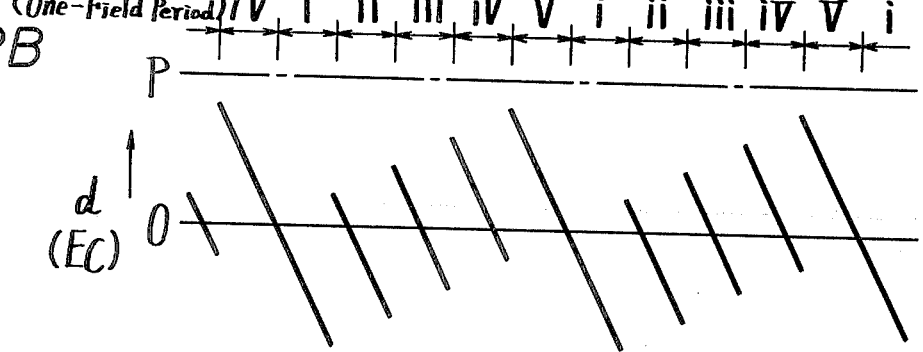
FIG. 2B
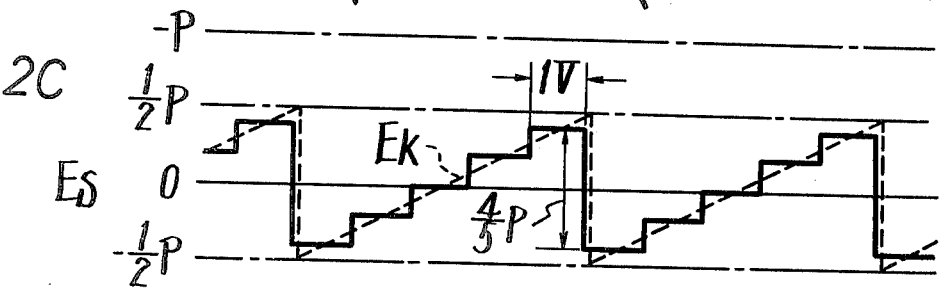
FIG. 2C
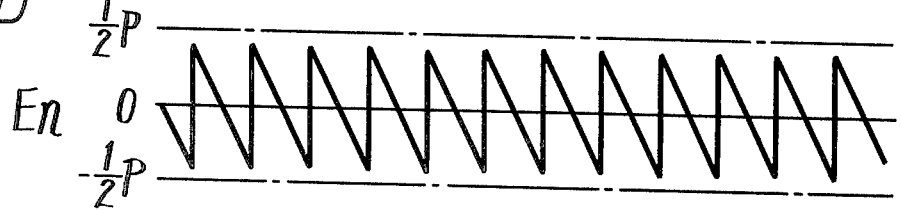
FIG. 2D
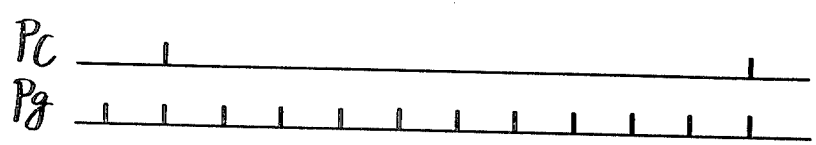
FIG. 2E
FIG. 2F FIG. 4A  Pc 
FIG. 4B  Pf 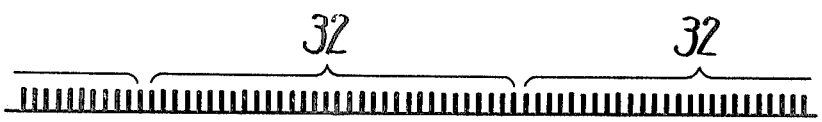
FIG. 4C  Ek 

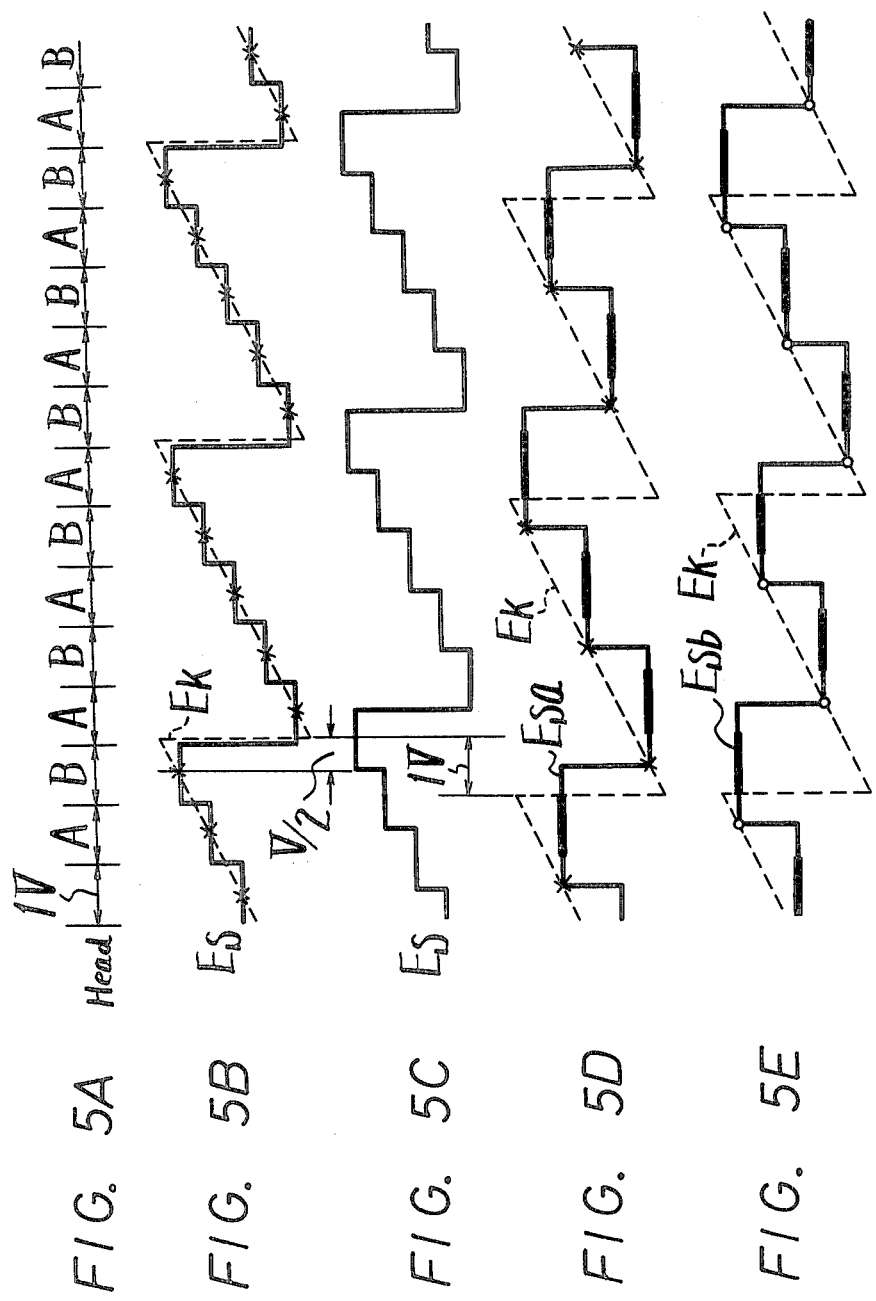

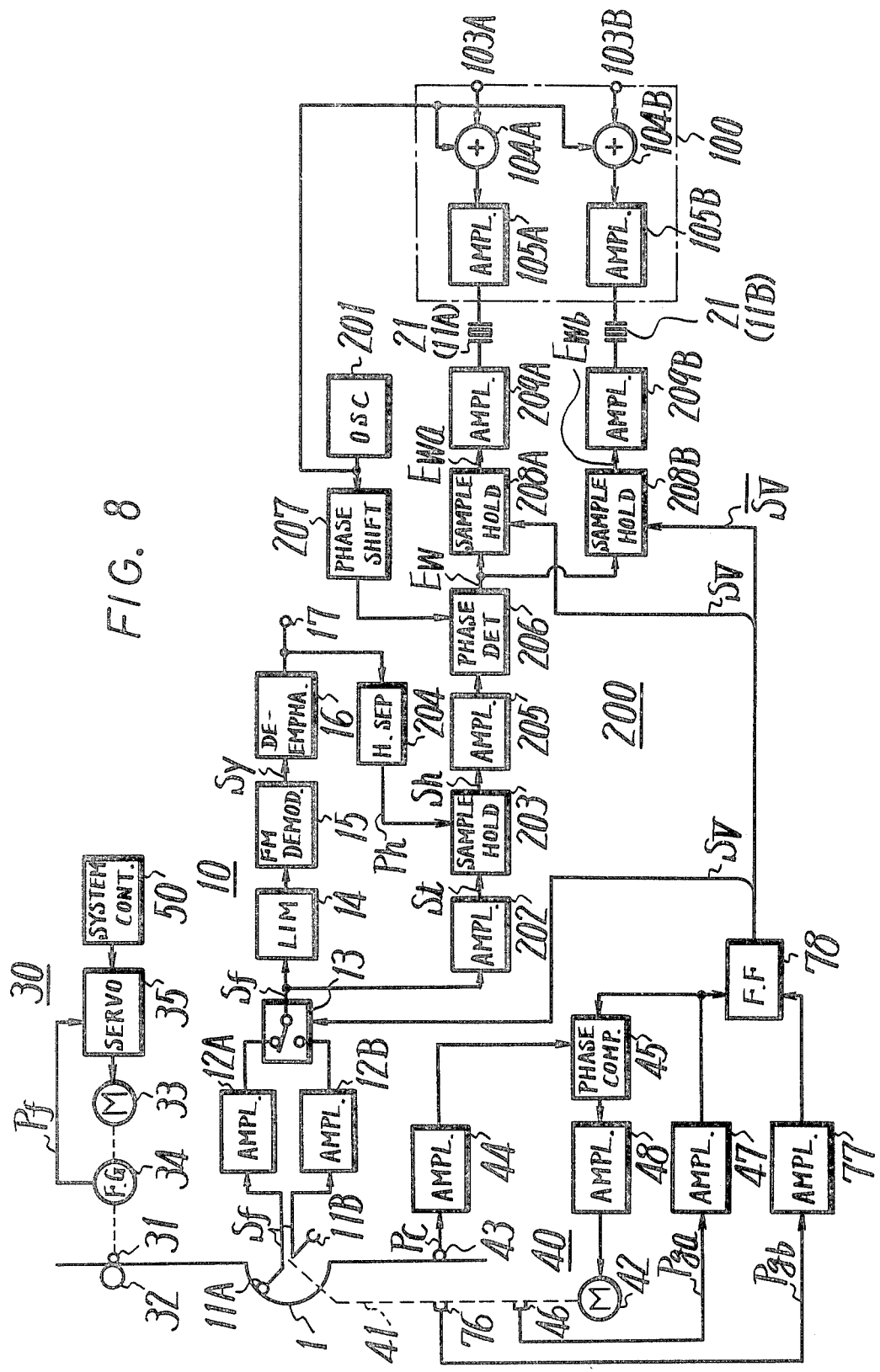

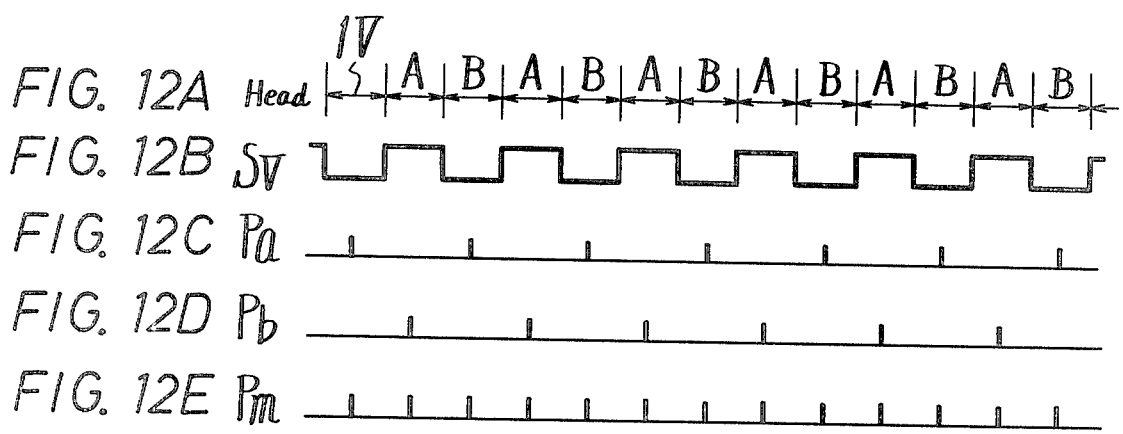
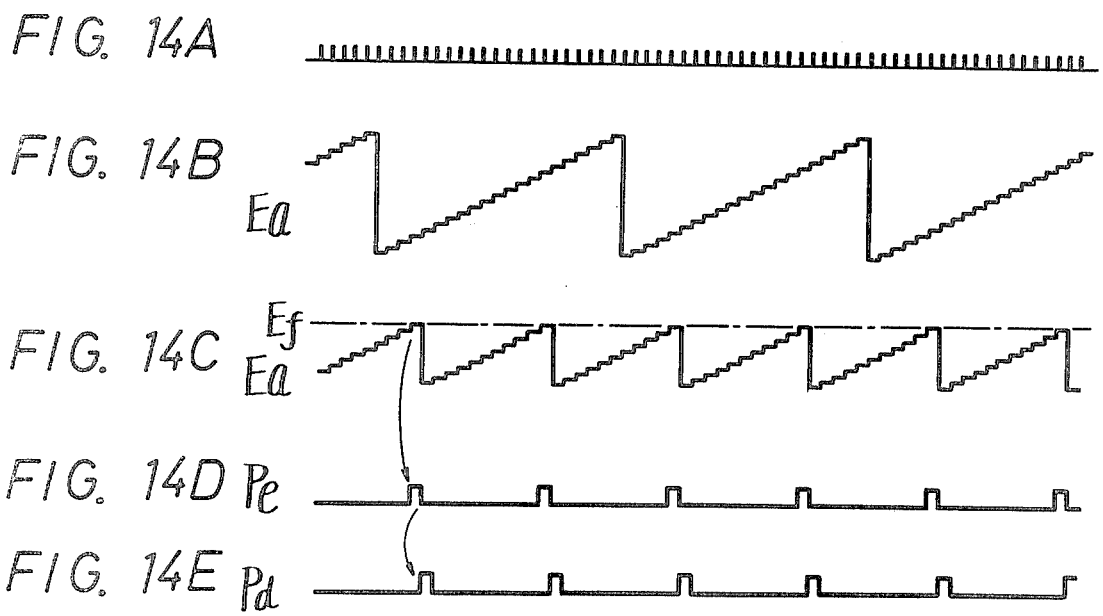

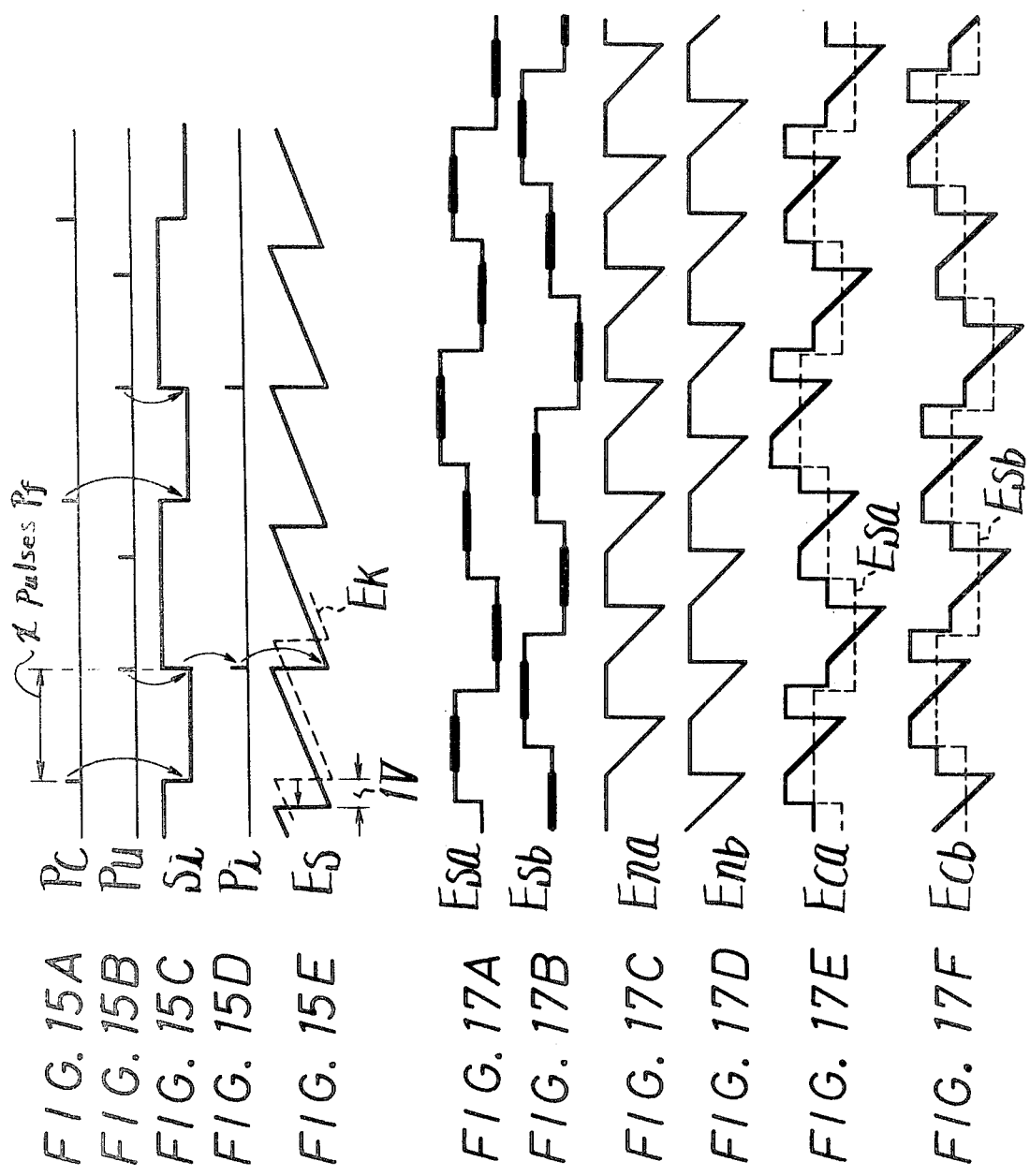

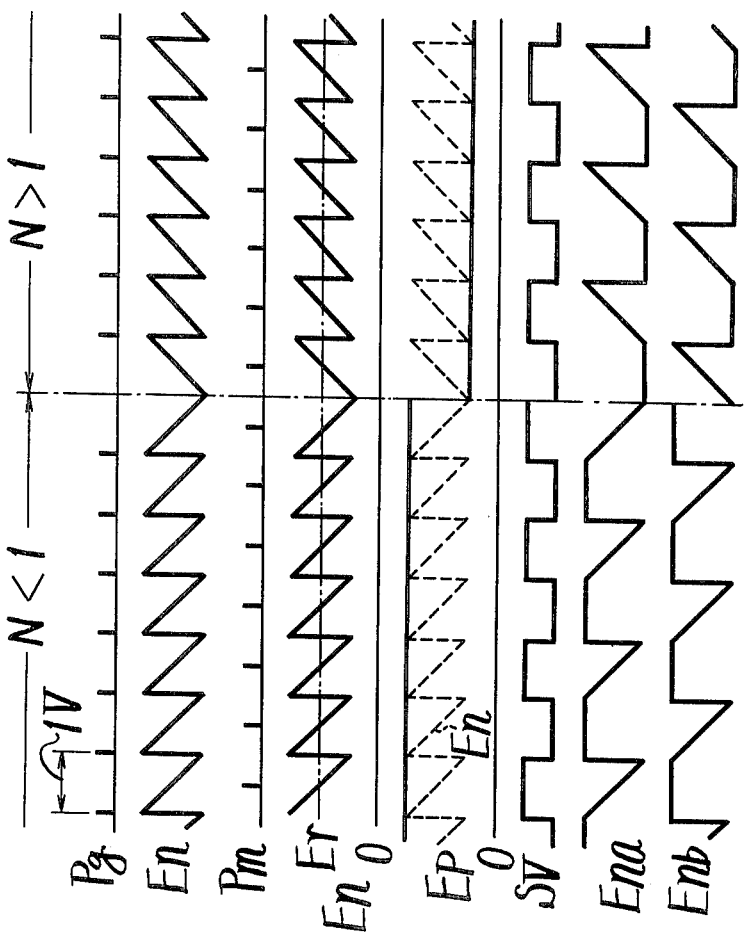

TRACKING CONTROL APPARATUS FOR A ROTARY HEAD, VARIABLE SPEED SIGNAL REPRODUCING SYSTEM

BACKGROUND OF THE INVENTION

This invention relates to tracking error control apparatus for use in h signal reproducing system and, more particularly, to such apparatus for correcting tracking errors that may arise when a record medium from which signals are reproduced is moved relative to one or more rotary transducers at a speed that differs from the speed thereof at which such signals originally were recorded.

In rotary head recording/reproducing systems, signals can be recorded with relatively high density over a relatively wide frequency spectrum in a series of parallel tracks on a movable record medium. Typical of such recording/reproducing systems is the video tape recorder (VTR) in which video signals are recorded in parallel, skewed record tracks along a moving magnetic tape. In a typical VTR, one or more heads serves as a recording head and also as a reproducing head; and such head or heads is rotated at a substantially constant speed for both recording and reproducing operations. If the speed at which the magnetic tape moves during a reproducing operation is identical to the speed at which the tape was moved during a recording operation, then each scanning trace of the reproducing head easily can be made to coincide with each previously recorded record track. However, such coincidence is not readily obtained if the tape is moved at a slower or faster speed during the reproducing operation. That is, if the ratio between the tape reproducing speed and the tape recording speed is N, then a tracking error will occur when $N \neq 1$.

In the aforementioned reproducing mode wherein $N \neq 1$, the scanning traces of each reproducing head will be parallel to each other, but such traces will not be parallel to the record tracks on the magnetic tape. For example, if $N < 1$, the angle which each scanning trace makes with respect to the longitudinal axis of the tape is smaller than the angle which each record track makes with this longitudinal axis. Furthermore, when $N < 1$, a plurality of scanning traces may be formed across the tape, whereas only a single record track is recorded. Each of these traces exhibits a deviation, or tracking error, with respect to the particular record track which is being scanned.

In order to overcome this problem, a so-called displaceable support member has been developed for each reproducing head. The displaceable support member may be an electrostriction device, such as a piezoceramic element known, for example, as a bi-morph leaf assembly. Typically, a bi-morph leaf assembly is responsive to control signals to deflect by an amount that is determined by such control signals. It is appreciated that if a head is mounted upon such a bi-morph leaf assembly, the deflection of the assembly will result in a displacement of the head. It has been proposed, heretofore, to arrange the bi-morph leaf assembly such that, as the reproducing head is rotated, control signals applied to the bi-morph leaf assembly will result in a corresponding displacement of the head in a direction which is transverse to the scanning trace. Consequently, even if the scanning trace of the head crosses, or intersects, a record track, compensating control signals can be applied to the bi-morph leaf assembly such that the head is displaced in a direction to bring it into coincidence with that record track.

When $N \neq 1$, the compensating drive signal which must be supplied to the bi-morph leaf assembly to eliminate the head tracking error generally is of a sawtooth waveform. If a plurality of traces are formed for each record track, as is the case when $N < 1$, each trace must be shifted by a respective, constant amount in addition to being continuously adjusted for coincidence with the record track. This means that, in addition to the sawtooth waveform which is used as a compensating drive signal for the bi-morph leaf assembly, a staircase waveform compensating drive signal also must be supplied thereto. Both the sawtooth waveform and the staircase waveform have parameters which are dependent upon the actual speed at which the tape is moved. For the proper compensation of tracking errors, the apparatus which is used to produce the compensating drive signals must, therefore, take the actual tape speed into account.

OBJECTS OF THE INVENTION

Therefore, it is an object of the present invention to provide improved apparatus for compensating head tracking errors in a signal reproducing system wherein the record medium from which signals are reproduced is movable at various different speeds.

Another object of this invention is to provide apparatus for correcting head tracking errors in a signal reproducing system, such as a VTR, in which correction is dependent, at least in part, upon the actual speed at which the record medium from which the signals are reproduced is moved.

A further object of this invention is to provide tracking error control apparatus for use in a signal reproducing system of the type in which one or more rotary heads scans a movable record medium, the heads being supported on respective displacement support members, in which the support members exhibit inherent time delays which are taken into account by the error correcting apparatus.

Various other objects, advantages and features of the present invention will become readily apparent from the ensuing detailed description, and the novel features will be particularly pointed out in the appended claims.

SUMMARY OF THE INVENTION

In accordance with this invention, tracking error correcting apparatus is provided for use in a signal reproducing system of the type having one or more rotary heads which scan traces across a movable record medium, such as a tape, to reproduce signals which had been recorded previously in parallel record tracks, and wherein the speed at which the record medium moves during the reproducing operation is N times the speed at which the tape moved during the recording operation. A frequency generator generates speed representing pulses having a frequency representing the speed of the record medium. These pulses are counted by a cyclical, or resettable counter, and a level generator generates a level corresponding to the count then present in the counter at the time that a head reaches the middle portion of its scanning trace. The generated level is supplied as a compensating drive signal to the displaceable support member upon which the head is mounted, thereby displacing the head in a direction to compensate for any tracking error between its scanning trace and the record track being scanned thereby. In accordance with one aspect of this invention, a sawtooth signal is added to each generated level, and the summed signals are supplied to the displaceable support member. This sawtooth signal has a period equal to the period of a head scanning trace, and an amplitude which is a function of the speed of the record medium. Preferably, the generated level is supplied to the displaceable support member prior to the time that the head mounted thereon rotates into scanning relationship with the record medium, and the sawtooth signal is added to this level at the beginning of the scanning relationship.

The cyclical, or resettable, counter is controlled in accordance with the speed at which the record medium is moved, so as to insure that the levels which are generated from the count thereof are accurate regardless of the speed of the record medium.

BRIEF DESCRIPTION OF THE DRAWINGS

The following detailed description, given by way of example, will best be understood in conjunction with the accompanying drawings in which:

FIGS. 2A-2F and 3A-3E are useful in understanding the problem to which the present invention is addressed;

FIGS. 4A-4C are signal waveforms which are helpful in understanding one aspect of the present invention;

FIGS. 5A-5E are waveform diagrams which are useful in explaining another aspect of the present invention;

FIG. 8 is a block diagram of a portion of a signal reproducing system with which the present invention is used;

FIGS. 12A-12E, 13A-13C, 14A-14E, 15A-15E, 16A-16H, and 17A-17F are waveform diagrams which are helpful in understanding the operation of the present invention;

DETAILED DESCRIPTION OF A PREFERRED EMBODIMENT

Figure 1:
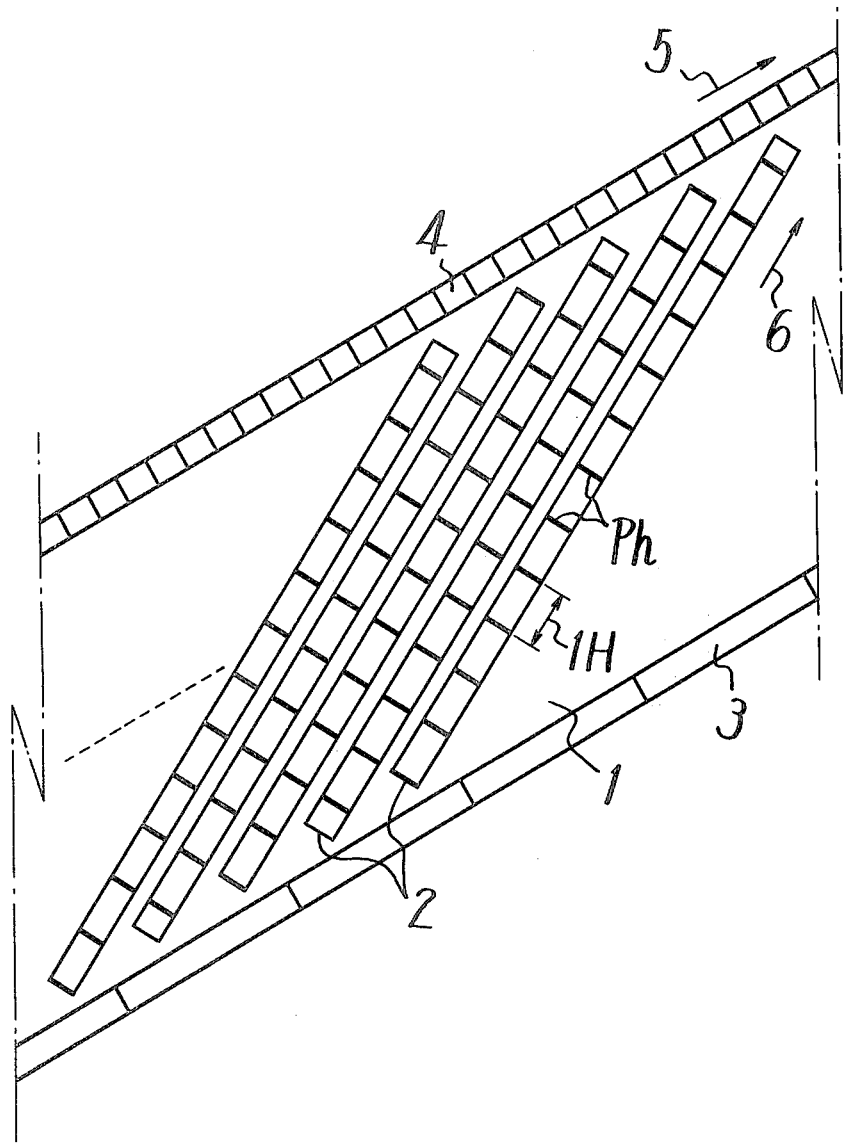
FIG. 1 is a schematic representation of a portion of the magnetic tape upon which various record tracks have been recorded.

Referring now to the drawings, wherein like reference numerals are used throughout, FIG. 1 is a schematic illustration of a typical recording medium 1 upon which parallel record tracks 2 are recorded. For the purpose of the present discussion, it is assumed that record medium 1 is a magnetic tape. However, it should be readily appreciated that the record medium may comprise a magnetic sheet or other conventional recording medium upon which signals are recorded in parallel record tracks. Furthermore, it is assumed that the signals which are recorded in tracks 2 are FM video signals, such as monochrome or color video signals, including the usual vertical and horizontal synchronizing pulses. As an example, the video signals which are recorded in tracks 2 may be formed therein by a so-called two-head helical scan VTR. In addition to recording the video signals in tracks 2, the typical VTR system records control pulses $P_c$ in a longitudinal track 3, positioned along one edge of tape 1, and further records audio signals in a longitudinal track 4, the latter being positioned along the opposite edge of the tape.

As is conventional, during a recording operation, tape 1 is driven at a servo-controlled constant speed in the direction of arrow 5, and each head rotatably scans a trace across the tape in the direction of arrow 6. Thus, tracks 2 are skewed relative to the longitudinal axis of the tape. Adjacent tracks are separated by a guard band, and each track contains a single field of FM video signals. Of course, each field of video signals contains horizontal synchronizing pulses $P_h$ which, preferably, are in alignment with each other from one track to the next. This is the so-called H-alignment, which is effective to reduce unwanted cross-talk interference between adjacent tracks. Although not shown in FIG. 1, the vertical synchronizing pulses are recorded at the beginning portion of each track 2.

Each control pulse $P_c$ is associated with a respective track, and these control pulses are recorded at the frame frequency such that alternate tracks 2 are associated with corresponding control pulses $P_c$. It may be appreciated that if a control pulse playback head is provided so as to reproduce the control pulses $P_c$ recorded in control pulse track 3, each reproduced control pulse is indicative of the particular position of tape 1. During a normal reproducing operation, that is, during a reproducing operation wherein tape 1 is moved at the same speed as during the recording operation, a control pulse $P_c$ is reproduced in predetermined phase relationship with the position of a rotary head. For example, the control pulse is reproduced at the same time that a rotary head rotates into its initial scanning relationship with respect to a corresponding track 2. If the predetermined phase relationship between the reproduced control pulse $P_c$ differs from the expected phase of the head, a servo system is provided to adjust the rotary phase of the head so as to insure the proper tracking of each record track 2 by a head. Furthermore, the rate at which control pulse $P_c$ is reproduced is a function of the speed at which tape 1 is moved.

For the purpose of the present discussion, let it be assumed that N represents the ratio between the speed at which tape 1 is moved during a reproducing operation and the speed at which this tape was moved during a recording operation. Of course, if N=1, the reproducing speed is equal to the recording speed; and this commonly is referred to as the normal reproducing mode. For a slow motion mode of reproduction, N<1, and for a fast motion mode of reproduction, N>1. For a reverse mode of reproduction, N is negative. Finally, if N=0, the VTR is operated in its stop motion mode of reproduction. The present invention is directed to reproducing the signals which are recorded in tracks 2 for all values of N. It is appreciated that if N≠1, then the scanning trace of each head will not, without any dynamic displacement thereof, coincide with a record track. For the case of a VTR, this tracking error between the scanning trace of the head and the record track results in a deterioration in the quality of the video picture which ultimately is reproduced. In order to overcome this problem, it has been proposed heretofore to support each head on a displaceable support member, such as an electrostriction element. Typical examples of electrostriction elements which can be used are piezo-ceramic members, such as a bi-morph leaf assembly. The advantage offered by such displaceable support members is that they can be driven so as to deflect in response to a control signal applied thereto. This deflection, if properly controlled, will bring the scanning trace of the head which is mounted on the displaceable support member into coincidence with the record track that is being scanned.

An example of the tracking error which arises when N≠1 is shown in FIGS. 2A–2F, wherein it is assumed that N=1/5. As shown in FIG. 2A, at this speed (i.e., wherein N=1/5), five individual scanning traces i, ii, iii, iv and v can be produced between adjacent record tracks 2. For the purpose of the present discussion, it is assumed that these scanning traces i-v are intended to traverse record track 2A. It is further assumed, for the purpose of simplification, that the commencement of trace i coincides with the commencement of record track 2A. It is further assumed that these scanning traces are formed by two rotary heads which may be identified as heads A and B. That is, trace i is formed by head A, trace ii is formed by head B, trace iii is formed by head A, trace iv is formed by head B, trace V is formed by head A, and so on. Of course, since tape 1 is moved at a constant speed (which, as assumed herein, is one-fifth the normal tape speed), scanning traces i-v all are parallel to each other and are angled to intersect record track 2A.

If the separation between the center lines of adjacent record tracks 2 is assumed to be p, then the deviation d of a given trace i-v is as shown. When a trace deviates to the left of record track 2A, it is assumed that deviation d is positive and, conversely, if the trace deviates to the right of record track 2A, it is assumed that this deviation d is negative. The deviation d of trace i varies from zero at the commencement of this trace to a maximum of −4/5p. The deviation d of trace ii varies from +1/5p at the beginning of this trace to −3/5p at the end thereof. In a similar manner, trace iii exhibits a deviation d that varies from +2/5p to −2/5p; trace iv exhibits a deviation d that varies from +3/5p to −1/5p; and trace v exhibits a deviation d that varies from +4/5p to 0. This deviation of the respective traces is shown in FIG. 2B, wherein the ordinate represents a corresponding correction voltage $E_c$ which must be applied during each scanning trace to the displaceable support member upon which each head is mounted in order to correct for the deviation d, and the ordinate also represents this deviation d.

It is seen that each trace i-v is formed during one head field period of time. For the purpose of the present discussion, the expression "head field period" means the period that each head (A or B) scans a complete trace across the tape. Of course, when N=1, each scanning trace coincides with a record track and, therefore, each head field period is equal to each video field period. If, during each successive head field period, a correction voltage having the waveform as shown generally in FIG. 2B is supplied to the displaceable support member upon which the head A or B is mounted, the deviation d of the trace formed by the head will be cancelled. This means that, during each head field period, the head will be displaced in a direction such that its scanning trace coincides with record trace 2A. From FIG. 2B, it is appreciated that the slope of this correcting voltage $E_c$ is the same for each head field period, because all of the traces i-v are parallel to each other. However, the DC level of each correcting voltage varies in a stepwise manner, of constant step level.

Correction voltage $E_c$, as shown in FIG. 2B, may be thought of as being constituted by a staircase component and a sawtooth component. The staircase component is shown as the staircase waveform $E_s$ in FIG. 2C, wherein the width, or duration, of each step is equal to one head field period, that is, the width of each step is equal to the duration of a scanning trace. Furthermore, since the maximum deviation of a trace from record track 2A is seen to be equal to 4/5p, such as the deviation d for traces i and v, the peak-to-peak amplitude of the staircase waveform $E_s$ is equal to 4/5p. The height of each step is seen to be one-fifth of this peak-to-peak amplitude.

The sawtooth component which is included in correction voltage $E_c$ is shown in FIG. 2D as the sawtooth waveform $E_n$. The period of each sawtooth wave is equal to the head field period, and the peak-to-peak amplitude thereof, referred to hereinafter merely as the amplitude of the sawtooth waveform, also is equal to 4/5p. If the displaceable support member upon which each head is mounted is an electrostriction element, such as a bi-morph leaf assembly, the staircase waveform $E_s$ and the superimposed sawtooth waveform $E_n$ may be staircase and sawtooth voltages. Thus, FIG. 2C represents the staircase waveform voltage component of correction voltage $E_c$, and FIG. 2D represents the sawtooth waveform voltage component of the correction voltage.

The staircase waveform voltage $E_s$ may be derived by providing a sawtooth voltage $E_k$, shown by broken lines in FIG. 2C, whose instantaneous amplitude is sampled at the middle portion of each scanning trace. The period of each sawtooth voltage $E_k$ is equal to the time required to move tape 1 a distance equal to the separation between adjacent record tracks 2. Furthermore, since, as shown in FIG. 1, a control pulse $P_c$ is recorded in control pulse track 3 in a predetermined position with respect to an associated record track 2, it is seen that the reproduction of the control pulse may be used to synchronize, or commence, the sawtooth voltage $E_k$. This is shown by comparing FIG. 2C with FIG. 2E. Of course, a control pulse $P_c$ is recorded for every other record track and, therefore, two sawtooth voltages $E_k$ can be produced in the period between successive control pulses.

In a conventional rotary head helical-scan VTR, the drive shaft which is used to rotate the heads usually is provided with a sensible element, such as a magnetic indicia, located with predetermined angular position with respect to the heads. A fixed pick-up, such as a magnetic sensor, is disposed such that a head position pulse $P_g$ is produced whenever a head A or B rotates to a predetermined position on tape 1. As an example, this position may be the commencement of a scanning trace. FIG. 2F represents a train of head position pulses $P_g$ which is produced during the rotation of the rotary heads. Since it is assumed herein that N=1/5, there are five head position pulses $P_g$ produced during each sawtooth voltage $E_k$. These head position pulses can be used to sample the sawtooth voltage $E_k$ to produce the staircase waveform voltage $E_s$ having five step levels during each sawtooth voltage $E_k$. These head position pulses $P_g$ also may be used to trigger a sawtooth waveform voltage generator to produce the sawtooth waveform voltage $E_n$ shown in FIG. 2D.

It may be seen that even if the commencement of scanning trace i, for example, does not coincide with record tracks 2A, the proper staircase waveform voltage $E_s$ nevertheless may be produced. If the commencement of a scanning trace does not coincide with the commencement of a record track, head position pulses $P_g$ will be shifted relative to control pulses $P_c$ so as not to be time coincident therewith. Nevertheless, sawtooth voltage $E_k$, since it is synchronized with control pulses $P_c$, will commence with the reproduction of a control pulse. The phase-shifted head position pulses $P_g$, if used to sample the sawtooth voltage $E_k$, will produce proper step levels which will, of course, account for the possibility that the commencement of a scanning trace does not coincide with the commencement of a record track. For example, if the commencement of trace i occurs to the left of the commencement of record track 2A, head position pulses $P_g$ will be shifted to the left of control pulse $P_c$. This means that the sampling times of sawtooth voltage $E_k$, attributed to the head position pulses $P_g$, will be shifted to the left of the sampling times shown in FIG. 2C and, consequently, the staircase waveform voltage $E_s$ will appear to be shifted in the downward direction. This accounts for the shift of trace i, and the correction voltage $E_c$ formed by superimposing the staircase and sawtooth waveform voltages will cancel the deviation d of each shifted scanning trace relative to record trace 2A.

Figure 3A:
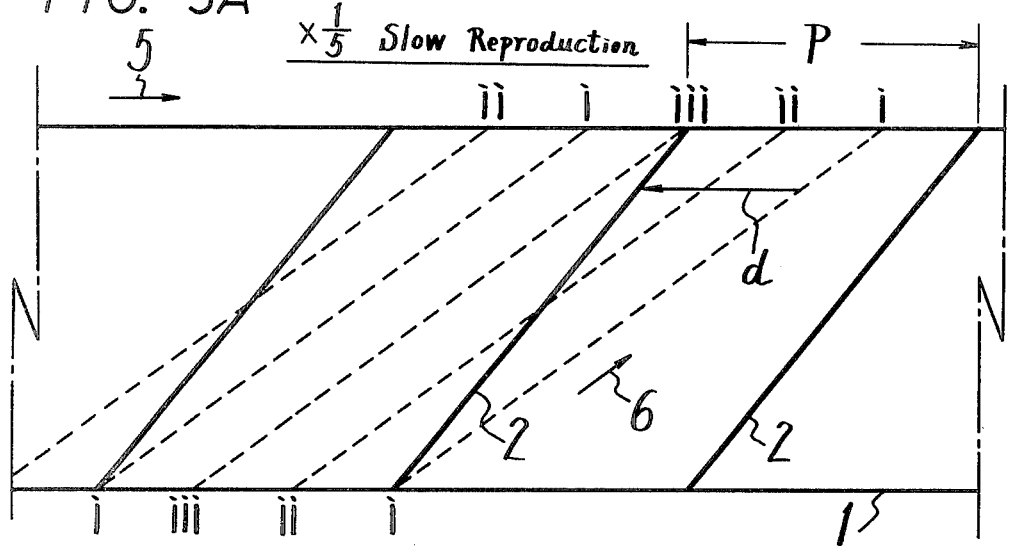
Figure 3B:
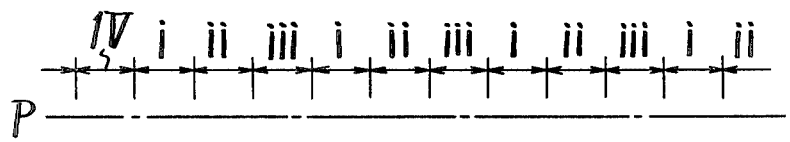
Figure 3C:
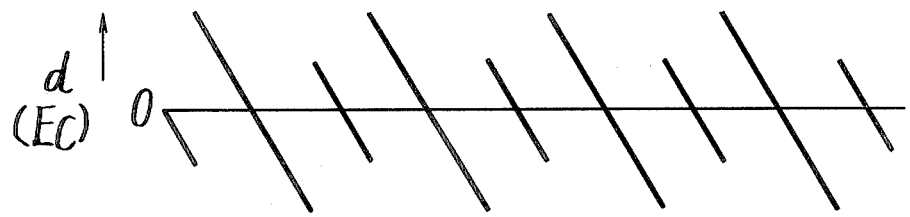
Figure 3D:
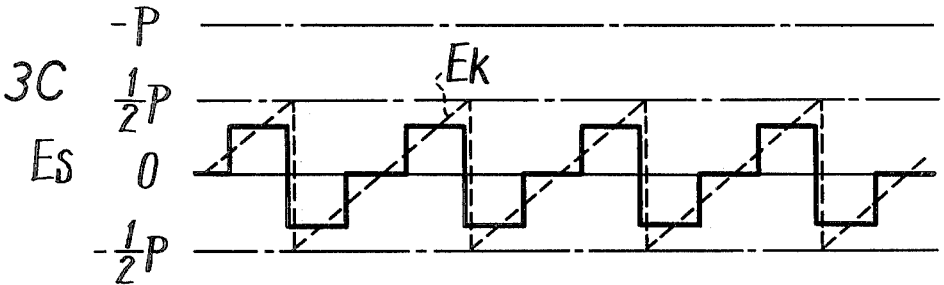
Figure 3E:
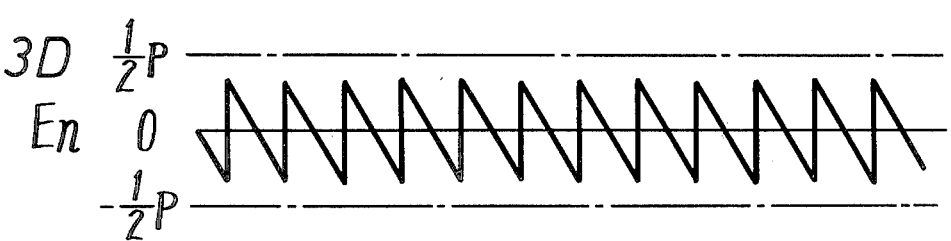

While the waveforms shown in FIGS. 2A–2F represent the relationship between scanning traces of the heads A and B across tape 1 for the example wherein N=1/5, the waveforms shown in FIGS. 3A–3E are similar and represent the example wherein N=1/3. When tape 1 is moved at a speed that is one-third the normal tape speed, it is seen that three scanning traces i, ii, iii, are formed between successive record tracks 2. The maximum deviation d of trace i is equal to 2/3p, as opposed to the maximum deviation of 4/5p of trace i in FIG. 2A. The deviation d of each scanning trace, together with a representation of the correction voltage $E_c$ which, if applied to the displaceable support member upon which each head is mounted, will cancel this deviation, are shown in FIG. 3B. As before, this correction voltage $E_c$ may be produced by superimposing a staircase waveform voltage $E_s$ and a sawtooth waveform voltage $E_n$. However, as shown in FIG. 3C, since N=1/3, three head field periods are provided in the interval required to advance tape 1 from one track to the next. But, since the heads are rotated at a constant speed irrespective of the speed at which tape 1 is moved, it is seen that the period of the staircase waveform voltage $E_s$, shown in FIG. 3C, is less than the period of the staircase waveform voltage shown in FIG. 2C. Furthermore, since the maximum deviation d for the example shown in FIG. 3A is less than the maximum deviation d for the example shown in FIG. 2A, the peak-to-peak amplitude of the sawtooth waveform voltage $E_n$ in FIG. 3D is less than the peak-to-peak amplitude of the sawtooth waveform voltage shown in FIG. 2D.

For proper generation of the staircase waveform voltage $E_s$ in FIGS. 2C and 3C, the sawtooth voltage $E_k$, which is sampled to produce the staircase waveform voltage, must have the same peak-to-peak amplitude in both examples. That is, even though the period of this sawtooth voltage $E_k$ may change as the tape speed N changes, its amplitude must remain constant. Typically, the sawtooth voltage $E_k$ is produced by charging a capacitor. However, if the capacitor is charged with a constant current, the amplitude of the sawtooth voltage $E_k$ is a function of the duration that this capacitor is charged. Since the period of the sawtooth voltage in FIG. 3C is less than the period of the sawtooth voltage in FIG. 2C, if the same constant current is used to charge the capacitor for each example, it is clear that the sawtooth voltage $E_k$ in FIG. 3C will have a smaller amplitude than the sawtooth voltage $E_k$ in FIG. 2C. This means that, in order to obtain the proper amplitude for the example of FIG. 3C, the sawtooth voltage $E_k$ must be produced by charging the capacitor with a greater current. Unfortunately, this results in a very complicated charging circuit. Furthermore, there are significant limitations on the magnitude of the charging current and, therefore, it is difficult to obtain a sawtooth voltage $E_k$ of the same amplitude for all tape speeds.

The present invention proceeds, in part, on the recognition that, as the speed of tape 1 is increased, the period of the reproduced control pulses $P_c$ is decreased, but the period of the head position pulses $P_g$ remains constant. This is clear from comparing FIGS. 2E, 2F with FIG. 3E. If a frequency generator is coupled to the tape drive mechanism, for example, if a so-called frequency, or tone, wheel is mechanically coupled to the motor which is used to drive the usual capstan, then as the speed at which tape 1 is driven is increased, the frequency of the signal which is obtained from the frequency generator likewise is increased. Referring to FIGS. 4A–4C, let it be assumed that the frequency generator generates tape speed pulses $P_f$ whose frequency is, of course, directly related to the speed at which the tape is driven. Of course, the rate at which control pulses $P_c$ is reproduced also is directly related to the speed at which the tape is driven. Consequently, a constant number of tape speed pulses $P_f$ will be generated during the period between adjacent control pulses $P_c$. In FIG. 4B, it is assumed that 32 tape speed pulses are generated during this period. Thus, regardless of the tape speed, a constant number of tape speed pulses $P_f$ always will be produced in the interval between adjacent control pulses $P_c$. In the examples shown in FIGS. 4A and 4B, since the control pulses $P_c$ are reproduced at the rate of 30 Hz during a normal tape speed (N=1), and since 32 tape speed pulses $P_f$ are generated during the interval between adjacent control pulses, it is seen that the frequency of the tape speed pulses is 960 Hz.

Furthermore, and as discussed above, two sawtooth voltage periods $E_k$ are produced during the interval between adjacent control pulses $P_c$. The control pulses can be used to synchronize the sawtooth voltage $E_k$, as shown in FIGS. 4A and 4C. Now, if it is assumed that 32 tape speed pulse $P_f$ always are generated during the interval between adjacent control pulses $P_c$, then 16 tape speed pulses are generated during each sawtooth voltage period. In accordance with one aspect of the present invention, the sawtooth voltage $E_k$ is generated by counting the tape speed pulses $P_f$ and converting the count to an analog signal. When 16 tape speed pulses have been counted, the counter is reset so as to return the analog signal to its initial level. Furthermore, to insure the synchronization between the counting of tape speed pulses $P_f$ and the production of sawtooth voltage $E_k$ therefrom, the counter is forcibly reset in response to each control pulse $P_c$.

Since the sawtooth voltage $E_k$ is produced by converting the count of the tape speed pulses $P_f$ to an analog voltage, and since the same number of tape speed pulses are counted during the interval between adjacent control pulses irrespective of the speed at which the tape is driven, it is seen that the sawtooth voltage $E_k$ will have the same peak-to-peak amplitude in all instances, regardless of the particular tape speed. Thus, the aforenoted problem of having a constant peak-to-peak amplitude of the sawtooth voltage $E_k$ from which the staircase waveform voltage $E_s$ is produced, is overcome by the present invention, to be described in greater detail below.

Referring to FIGS. 5A and 5B, the head field periods during which heads A and B scan alternate traces across tape 1 are shown, and the staircase waveform voltage $E_s$, discussed previously with respect to FIG. 2C, is redrawn in FIG. 5B. This staircase waveform voltage typically is obtained by sampling the sawtooth voltage $E_k$ when each head A, B advances to about the middle portion of its scanning trace. For the purpose of the present explanation, the term "middle portion" means that general portion, not necessarily a point, which is in a central area of the scanning trace of the head. As shown in FIG. 5B, when head A reaches the middle portion of its scanning trace, sawtooth voltage $E_k$ is sampled, and the sampled level represents the first step of the staircase waveform voltage $E_s$. Then, when head B reaches the middle portion of its scanning trace, sawtooth voltage $E_k$ is sampled to provide the next step of the staircase waveform voltage. This operation is repeated for each successive scanning trace of the heads, resulting in the staircase waveform voltage shown in FIG. 5B. Of course, the first step of this staircase waveform voltage represents the constant amount by which head A must be displaced in order to cause the beginning of its scanning trace to coincide with the beginning of the record track being scanned. The next step of the staircase waveform voltage represents the amount by which head B must be displaced in order to cause the beginning of its scanning trace to coincide with the beginning of the record track. Similarly, the remaining steps represent the displacement by which heads A and B must be displaced during successive head field periods in order to cause the beginning of the respective scanning traces thereof to coincide with the beginning of the record track being scanned.

It is appreciated that, in order to provide proper correction for the deviation of each scanning trace of heads A and B relative to the record track being scanned, the respective steps of the staircase waveform voltage $E_s$ shown in FIG. 5B should be supplied to the displaceable support member upon which each head is mounted at least as early as the time that the head commences its scanning trace. However, as shown by the "X" locations in FIG. 5B, each step in the staircase waveform voltage is not produced until after the head has reached the middle portion of its scanning trace. As a result thereof, the step-level correcting voltage which must be supplied to each displaceable support member at least as early as the time that the head mounted on that member commences its scanning trace is, in fact, supplied thereto at a time that is delayed by one-half the head field period. As shown in FIG. 5C, each step-level thus is supplied to a displaceable support member at a time that is too late to correct the deviation of the scanning trace of the head. Thus, rather than supplying the first step of the staircase waveform voltage $E_s$ to the displaceable support member upon which head A is mounted at the beginning of its scanning trace, this step is supplied when the head has completed approximately one-half of its scanning trace. This same undesirable delay is present for each successive scanning trace. Thus, if the sawtooth voltage $E_k$ has the waveform shown in FIG. 5B, the sampling of this waveform each time that a head reaches the middle of its scanning trace will not be successful in producing step voltages which will correct for the deviations of the respective traces relative to the record track being scanned.

As a further difficulty, a typical electrostrictive element, such as a bi-morph leaf assembly, exhibits an inherent time delay prior to responding to the control voltage applied thereto. Thus, the displaceable support member will not deflect immediately in response to the step-level which is applied thereto, even if such step levels are produced at the times represented in FIG. 5B. Hence, even if the staircase waveform voltage $E_s$ of FIG. 5B is produced, this inherent time delay of the displaceable support member will result in a tracking error of the head which is mounted thereon.

The foregoing is overcome in accordance with an aspect of the present invention wherein the sawtooth voltage $E_k$ is advanced in phase, and then this phase-advanced sawtooth voltage is sampled when each head reaches the middle portion of its scanning trace. When head B reaches the middle portion of its scanning trace, the phase-advanced sawtooth voltage is sampled, and the sampled level is supplied to the displaceable support member upon which head A is mounted, even though head A has not yet commenced its scanning trace. Then, when head A reaches the middle portion of its scanning trace, the phase-advanced sawtooth voltage $E_k$ is sampled and the sampled amplitude is supplied to the displaceable support member upon which head B is mounted. This operation is illustrated in FIGS. 5D and 5E, wherein FIG. 5D represents the staircase waveform voltage which is supplied to the displaceable support member upon which head A is mounted, and FIG. 5E represents the staircase waveform voltage which is supplied to the displaceable support member upon which head B is mounted. The staircase waveform voltage $E_{sa}$ which is supplied to the displaceable support member upon which head A is mounted is produced by sampling phase-advanced sawtooth voltage $E_k$ only during the middle portion of each head field period for head B. Similarly, the staircase waveform voltage $E_{sb}$ which is supplied to the displaceable support member upon which head B is mounted is produced by sampling the phase-advanced sawtooth voltage $E_k$ only during the middle portion of the head field period for head A. The bold lines of the staircase waveform voltages $E_{sa}$ and $E_{sb}$ represent the times that heads A and B, respectively, scan tape 1 and, moreover, represent that the displaceable support members upon which heads A and B are mounted have responded fully to the step-level control voltages which are applied thereto. In the examples shown in FIGS. 5D and 5E, sawtooth voltage $E_k$ is phase-advanced by one head field period relative to the sawtooth voltage $E_k$ shown in FIG. 5B, the latter being synchronized with the reproduced control pulses $P_c$.

Thus, even though the displaceable support members exhibit inherent time delays to the control voltages applied thereto, if the step levels which are supplied to these displaceable support members are provided in advance of the commencement of the scanning traces of the heads mounted thereon, such inherent time delay is accounted for.

Although sawtooth voltage $E_k$, as shown in FIGS. 5D and 5E, is a phase-advanced by one head field period relative to the sawtooth voltage shown in FIG. 5B, it is recalled that the sawtooth voltage is generated by counting tape speed pulses $P_f$, and then converting the digital count to an analog signal. Of course, the number of tape speed pulses $P_f$ which is produced during a head field period varies as the speed N of the tape varies. For example, when N=1/5, about three tape speed pulses $P_f$ are provided in a head field period. When N=⅓, about five tape speed pulses $P_f$ are provided in a head field period. Thus, in order to phase-advance the sawtooth voltage $E_k$ by one head field period, the speed at which the tape is driven must be ascertained in order to determine the number of tape speed pulses which correspond to a head field period.

Figure 6A:
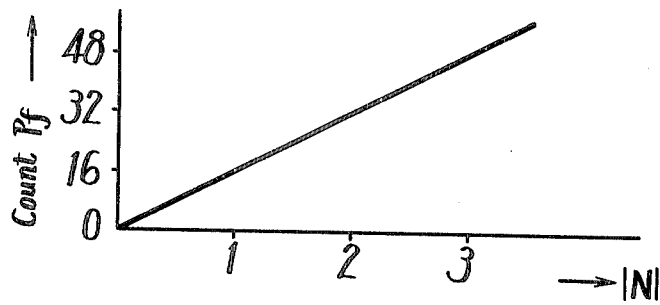
FIGS. 6A-6C are graphical representations which are used to explain the operation of one aspect of this invention.
Figure 6B:
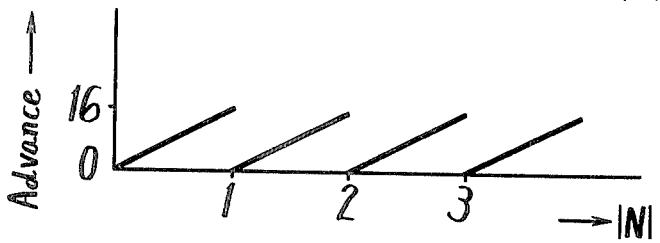

FIG. 6A is a graphical representation of the relationship between the speed N at which the tape is driven and the number of tape speed pulses $P_f$ which are generated during each head field period. As mentioned above, since 32 tape speed pulses are generated during the interval between adjacent control pulses $P_c$, as shown in FIGS. 4A and 4B, the graphical representation of FIG. 6A can be normalized with reference to 16 tape speed pulses, as shown in FIG. 6B. That is, if 16 tape speed pulses are used to produce the sawtooth voltage $E_k$, then, as shown in FIG. 6B, when N=1, one set of 16 tape speed pulses is provided during a head field period; when N=2, two sets (or 32) of tape speed pulses are provided during a heat field period; and when N=3, three sets (or 48) of tape speed pulses are provided during a head field period.

Figure 6C:
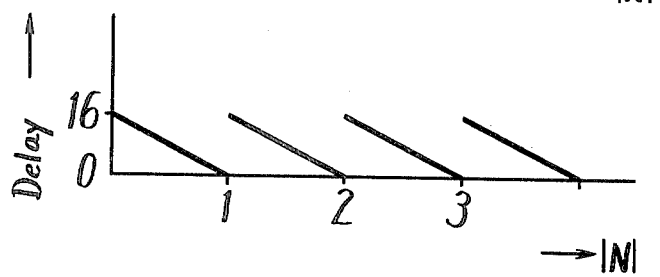

In order to provide the phase-advancement of the sawtooth voltage $E_k$, as shown in FIGS. 5D and 5E, the count of tape speed pulses $P_f$ at the time of occurrence of the control pulse $P_c$ must be delayed from a count of "0" by an amount which is a function of the tape speed N. FIG. 6C represents this delay in the count of the tape speed pulses. Stated otherwise, the count of the tape speed pulses $P_f$ which should be present at the time of occurrence of the control pulse $P_c$ is subtracted from a count of "16", and the amount which is subtracted is graphically represented in FIG. 6C. This delay in the count of the tape speed pulses $P_f$ results in a phase advance of the sawtooth voltage $E_k$.

Figure 7:
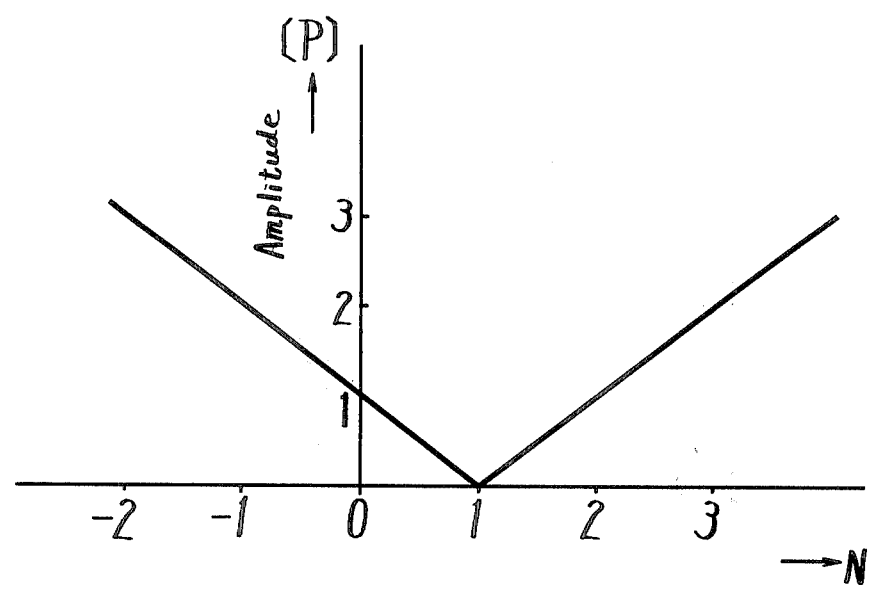
FIG. 7 is a graphical representation of the relationship between the speed of the record medium and the amplitude of the proper sawtooth correcting signal which is used in this invention.

As discussed hereinabove with respect to FIGS. 2D and 3D, it is seen that the peak-to-peak amplitude of the sawtooth waveform voltage $E_n$ is a function of the speed N at which tape 1 is driven. FIG. 7 is a graphical representation of this relationship, wherein the abscissa represents tape speed N and the ordinate represents the peak-to-peak amplitude of the sawtooth waveform voltage as a multiple of p, the center-to-center distance between adjacent record tracks. From the slope of the graphical representation in FIG. 7, it is seen that when N<1, the slope of the sawtooth waveform voltage $E_n$ is negative, that is, the slope is downward to the right; whereas when N>1, the slope of the sawtooth waveform voltage $E_n$ is positive, that is, it slopes upward to the right. It is recalled that, although the peak-to-peak amplitude of the sawtooth waveform voltage may vary as a function of the tape speed, the period of the sawtooth waveform voltage remains constant and equal to the head field.

In accordance with another aspect of the present invention, to be described, in addition to providing correcting voltages by which the deviation of the scanning trace of the heads relative to the record track being scanned can be corrected during so-called special modes of reproduction, that is, during modes wherein N≠1, tracking errors which may arise due to, for example, expansion or shrinkage of tape 1, differences in the mechanical components and tolerances from one VTR to another, and so on, also may be corrected. This is obtained by providing the closed loop correcting circuit in which the heads are vibrated, or dithered, from side to side across the width of the track being scanned, this dithering being performed at a constant frequency. The video signals which are reproduced by the dithering heads will exhibit an envelope which, when synchronously demodulated, results in an error voltage that represents the deviation of the average path traversed by the heads relative to the center of the track being scanned. This error voltage is fed back to the displaceable support members so as to deflect them in a direction whereby this deviation is cancelled.

An embodiment of a VTR in which the present invention can be used is illustrated in the block diagram of FIG. 8. The VTR includes a signal reproducing section 10, a tape drive section 30, a head servo circuit 40, an operation control circuit 50, a tracking control circuit 100 and a closed loop correction circuit 200. Signal reproducing section 10 includes reproducing heads 11A and 11B which are mounted for rotation by a head drive shaft 41 so as to scan parallel traces across tape 1, as described above. These heads may be angularly displaced from each other by 180° such that when head 11A is in reproducing contact with tape 1, head 11B is not.

Figure 10:
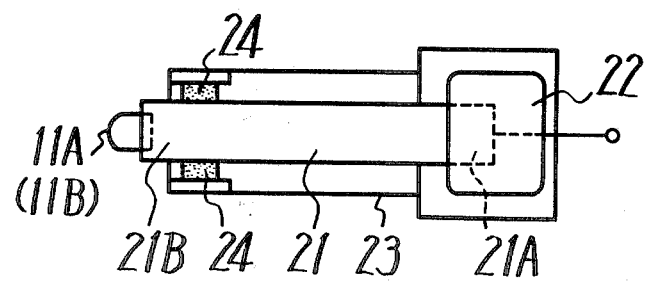
FIGS. 10 and 11 are top and side views, respectively, of one type of displaceable support member which can be used with the present invention.
Figure 11:
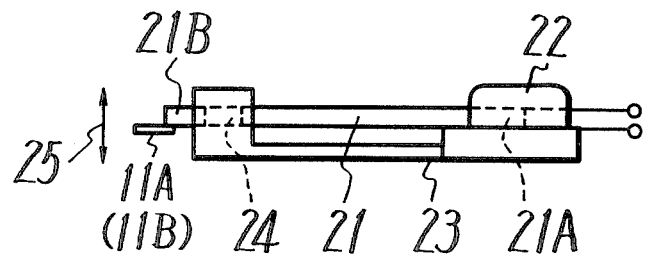

Heads 11A and 11B are supported on displaceable support members, one embodiment of which is illustrated in FIGS. 10 and 11. Each displaceable support member is formed of an electrostriction element 21, such as a bi-morph leaf assembly, known to those of ordinary skill in the art. One end 21A of this bi-morph leaf assembly is secured to a support member 23 by a suitable adhesive 22. As an example, electrostriction element 21 may be cantilever-mounted on support member 23. The other end 21B of the electrostriction element is adapted to support head 11A (11B) secured thereto by, for example, an adhesive. In addition, a damper element 24 is secured between the electrostriction element 21 and support member 23 so as to damp unwanted vibration, such as resonant vibrations, of the electrostriction element. As is typical, electrostriction element 21 is displaced in the direction of arrow 25 in response to a control voltage applied thereto. The direction of displacement is dependent upon the polarity of the control voltage, and the length, or degree, of displacement is determined by the magnitude of the control voltage.

Returning now to FIG. 8, heads 11A and 11B are mounted by the displaceable support members shown in FIG. 10 and 11 to a rotatable guide drum (not shown) which, in turn, is rotated by head drive shaft 41 driven by head drive motor 42. Typically, tape 1 is helically wrapped about the tape guide drum by at least 180° such that heads 11A and 11B scan alternate traces thereacross. Tape 1 is driven by tape drive section 30 which includes a capstan 31 and pinch roller 32. The capstan and pinch roller cooperate in conventional manner such that when capstan 31 is driven, as by motor 33, tape 1 is moved in the direction of rotation of the capstan.

A frequency generator 34 is mechanically coupled to capstan drive motor 33 and is adapted to generate the aforementioned tape speed pulses $P_f$. Consistent with the aforedescribed example, the frequency of tape speed pulses $P_f$ when N=1 is equal to 960 hertz. These tape speed pulses are supplied to a servo circuit 35 which also receives a tape speed drive signal from operation control circuit 50. The operation control circuit, although not shown in detail, may be provided with suitable operator-control switches and signal generators responsive to the selective operation of such switches to produce mode control signals. These mode control signals serve to determine whether the VTR is operated in its recording mode, playback mode, slow-motion mode, fast-motion mode, stop mode or reverse mode, as desired. Servo circuit 35 utilizes tape speed pulses $P_f$ to control the operation of capstan drive motor 33 such that tape 1 is driven at the speed and direction determined by the mode which is selected by operation control circuit 50.

Head servo circuit 40 is adapted to control head drive motor 42 in accordance with the phase relationship between heads 11A, 11B and the control pulses $P_c$ which are reproduced from tape 1. Accordingly, head servo circuit 40 includes a control pulse head 43 to reproduce such control pulses $P_c$, a pulse generator 46 adapted to generate head position pulses representing the rotary position, or phase, of head 11A or 11B and phase comparator 45 for comparing the phase of the control pulses $P_c$ to the phase of the head position pulses. Control pulse head 43 is disposed in alignment with control pulse track 3 (FIG. 1) which is recorded on tape 1. The control pulses $P_c$ which are reproduced by control pulse head 43 are supplied through an amplifier 44 to one input of phase comparator 45.

Pulse generator 46 is comprised of a suitable pick-up, such as a magnetic sensor, fixedly disposed adjacent head drive shaft 41. A sensible element, such as a magnetic element, is provided on head drive shaft 41 in predetermined relationship with respect to head 11A. Thus, when head 11A rotates to a predetermined position, such as the commencement of its scanning trace across tape 1, the sensible element provided on head drive shaft 41 is sensed by the pick-up, whereby pulse generator 46 generates the head position pulse $P_{ga}$ representing the corresponding rotary position of head 11A. Pulse generator 46 is coupled via a wave shaping amplifier 47 to another input of phase comparator 45. The wave shaping amplifier serves to shape the head position pulses $P_{ga}$. Any phase differential between the reproduced pulses $P_c$ and the head position pulses $P_{ga}$ is detected by phase comparator 45 which, in turn, supplies a phase error signal to head drive motor 42 via amplifier 48. This phase error signal adjusts the operation of head drive motor 42 such that head 11A is brought into proper scanning relationship with tape 1 at the time that a recorded control pulse $P_c$ is reproduced by control pulse head 43. Thus, head servo circuit 40 controls the rotation of heads 11A and 11B to be in proper phase synchronism with the movement of tape 1.

Returning to signal reproducing section 10, this section includes a change-over switch 13, an FM demodulator 15, a de-emphasis circuit 16 and a video output terminal 17. Heads 11A and 11B reproduce the FM video signals which are recorded in alternate record tracks on tape 1. The reproduced video signals from these heads are amplified by playback amplifiers 12A and 12B respectively, and the amplified video signals are supplied to respective fixed contacts of change-over switch 13. The change-over switch, shown schematically as a mechanical switch, includes a movable contact, or equivalent, which alternately couples the amplifier 12A and then amplifier 12B to its output. More particularly, the FM video signal reproduced by head 11A is coupled to the output of change-over switch 13 when that head scans tape 1; and then change-over switch 13 is changed over to couple the video signal reproduced from the tape by head 11B to the output thereof. Thus, at each head field period, the FM video signal $S_f$ produced by a corresponding one of heads 11A and 11B is supplied to the output of change-over switch 13.

The condition of change-over switch 13 is controlled by a rectangular wave signal $S_v$ which alternates between high and low levels in synchronism with the head field periods. As an example, when rectangular wave signal $S_v$ is at its relatively higher level, the FM video signal $S_f$ reproduced by head 11A is coupled to the output of change-over switch 13; while when the rectangular wave signal is at its relatively lower level, the FM video signal reproduced by head 11B is supplied to the output of the change-over switch. Rectangular wave signal $S_v$ is produced by flip-flop circuit 78, such as a set/reset flip-flop circuit having its set input connected to wave shaping amplifier 47 to be set in response to each head position pulse $P_{ga}$. The reset input of flip-flop circuit 78 is connected to a wave shaping amplifier 77 to be reset in response to each head position pulse $P_{gb}$ which is produced when head 11B advances to the beginning of its scanning trace. To this effect, another pulse generator 76, similar to aforementioned pulse generator 46, is provided to generate head position pulses $P_{gb}$ each time that head 11B rotates to the beginning of its scanning trace. Thus, during the head field period in which head 11A scans tape 1, flip-flop circuit 78 is in its set state, and rectangular wave signal $S_v$ is at its relatively higher level to couple the FM video signal $S_f$ reproduced by head 11A to the output of the change-over switch. During the next following head field interval, flip-flop circuit 78 is in its reset state and rectangular wave signal $S_v$ is at its relatively lower level to control change-over switch 13 to couple the FM video signal reproduced by head 11B to the output thereof. It is appreciated that the rectangular wave signal exhibits a waveform that is consistent with the scanning phases of heads 11A and 11B.

The FM video signal $S_f$, produced during successive field intervals at the output of change-over switch 13, is supplied through a limiter 14 to FM demodulator 15. The limiter serves to eliminate unwanted amplitude modulations of the FM video signal. FM demodulator 15 demodulates the video information contained in the FM video signal. If it is assumed that the recorded signal is a monochrome (or black-and-white) video signal, the output of FM demodulator 15 is a luminous signal $S_y$. This demodulated video signal then is supplied to video output terminal 17 via de-emphasis circuit 16; and then used by additional apparatus (not shown) to reproduce a video picture corresponding to the video signal. Of course, the reproduced video signal, provided at video output terminal 17, includes the usual horizontal and vertical synchronizing pulses.

Tracking control circuit 100 corrects the tracking errors of heads 11A and 11B during the so-called special modes of reproduction. That is, when $N \ne 1$, the deviation of the scanning traces of heads 11A and 11B relative to the previously recorded track, as discussed in detail above, are corrected by this tracking control circuit. A more detailed illustration of tracking control circuit 100 is illustrated in FIG. 9.

Figure 9:
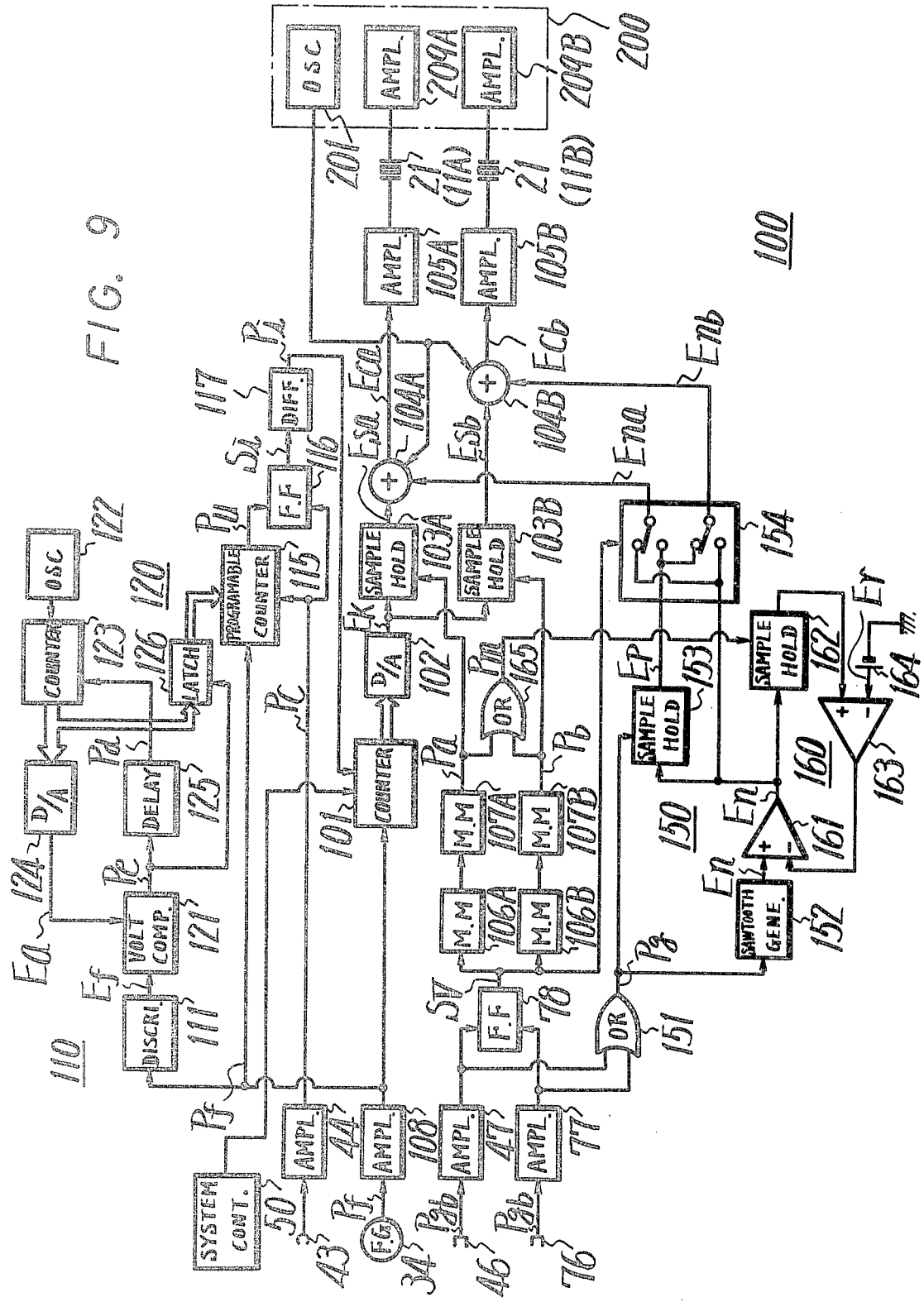
FIG. 9 is a block diagram illustrating various features of the present invention.

Referring to FIG. 9 in detail, tracking control circuit 100 includes a counter 101, a digital-to-analog (D/A) converter 102, sample-and-hold circuits 103A, 103B and a sampling pulse generator comprised of monostable multivibrators 106A, 107A and monostable multi-vibrators 106B, 107B. Counter 101 is a cyclical, or resettable counter which is adapted to count the tape speed pulses $P_f$ generated by frequency generator 34 (FIG. 8). These tape speed pulses are supplied through a wave shaping amplifier 108 to the count input of counter 101. In one embodiment, counter 101 is an UP/DOWN counter whose counting direction is determined by a suitable count control signal produced by operation control circuit 50. For example, when N is positive, that is, when tape is driven in the forward direction, operation control circuit 50 supplies a count UP signal to counter 101. Conversely, when N is negative, that is, when tape 1 is driven in the reverse direction, operation control circuit 50 supplies a count DOWN signal to counter 101. The counter may comprise a hexadecimal counter, whereby it counts to a count of 16 and then resets itself to resume the counting of the tape speed pulses.

The count produced by cyclical or resettable counter 101 is supplied as a digital count to D/A converter 102. The D/A converter is adapted to convert this count to a corresponding analog signal. Thus, as the count of counter 101 is incremented, D/A converter 102 produces a sawtooth voltage $E_k$ of positive slope. If the count of counter 101 is decremented, the D/A converter produces a sawtooth voltage of negative slope. The sawtooth voltage $E_k$ is supplied to sample-and-hold circuits 103A and 103B which are adapted to sample the sawtooth voltage at a time that corresponds to the middle portion of a scanning trace. The sampling pulses which are supplied to, for example, sample-and-hold circuit 103A are produced substantially when head 11B reaches the middle portion of its scanning trace and, conversely, the sampling pulses which are supplied to sample-and-hold circuit 103B are produced when head 11B reaches the middle portion of its scanning trace.

The aforementioned sampling pulses, designated sampling pulses $P_a$ and $P_b$, are derived from the aforementioned rectangular wave signal $S_v$. For convenience, pulse generators 46 and 76, together with wave shaping amplifiers 47 and 77 and flip-flop circuit 78, described previously with respect to FIG. 8, are shown in FIG. 9. Let it be assumed that the rectangular wave signal is at its relatively higher level during the period that head 11A scans tape 1, and that this rectangular wave signal is at its relatively lower level during the period that head 11B scans the tape. Monostable multivibrator 106A is coupled to flip-flop circuit 78 to receive the rectangular wave signal $S_v$ and is adapted to be triggered in response to the trailing edge or negative transition, in the rectangular wave signal. The time constant of monostable multivibrator 106A is equal to approximately one-half of a head field interval. At the completion of that time constant, monostable multivibrator 106A, which had been triggered to its quasi-stable state, returns to its stable state, and this transition in the output thereof triggers monostable multivibrator 107A to produce sampling pulse $P_a$. Monostable multivibrator 106B is similar to monostable multivibrator 106A, but is triggered to its quasi-stable state and responds to the leading edge, or positive transition, of rectangular wave signal $S_v$. The time constant of monostable multivibrator 106B is approximately equal to one-half of a head field interval, at which time it returns to its stable state. This transition in the output of monostable multivibrator 106B triggers monostable multivibrator 107B to produce the sampling pulse $P_b$.

The waveforms which are produced when sampling pulses $P_a$ and $P_b$ are generated are shown in FIGS. 12A–12E. FIG. 12A represents the head field periods during which heads 11A and 11B scan alternate traces across tape 1. As shown in FIG. 12B, the rectangular wave signal $S_v$ is at its relatively higher level during the head field period in which head 11A scans tape 1, and the rectangular wave signal is at its relatively lower level during the head field period in which head 11B scans the tape. Monostable multivibrator 106A is triggered to its quasi-stable state and responds to the negative transition in rectangular wave signal $S_v$, and at the conclusion of the time constant of this monostable multivibrator, monostable multivibrator 107A is triggered to generate sampling pulse $P_a$, as shown in FIG. 12C. Conversely, monostable multivibrator 106B is triggered to its quasi-stable state and responds to the positive transition in the rectangular wave signal $S_v$, and when this monostable multivibrator returns to its stable state, monostable multivibrator 107B is triggered to generate sampling pulse $P_b$, as shown in FIG. 12D. Sampling pulses $P_a$ are supplied to sample-and-hold circuit 103A; and sampling pulses $P_b$ are supplied to sample-and-hold circuit 103B. In addition, sampling pulses $P_a$ and $P_b$ are supplied through an OR circuit 165 to produce sampling pulses $P_m$ (FIG. 12E) for a purpose soon to be described. It is seen that sampling pulses $P_m$ are generated at the head field rate.

It is appreciated that D/A converter 102 generates the sawtooth voltage $E_k$ which has been described previously with respect to FIGS. 5D and 5E. It is seen from FIG. 12C that sampling pulses $P_a$ are generated each time that head 11B reaches the middle portion of its scanning trace, that is, at about one-half of a head field period prior to the time that head 11A commences its scanning trace. Thus, the sampling of the sawtooth voltage $E_k$ in sample-and-hold circuit 103A by sampling pulses $P_a$ results in the staircase waveform voltage $E_{sa}$ shown in FIG. 5D. In a similar manner, the sampling of the sawtooth voltage $E_k$ in sample-and-hold circuit 103B by sampling pulses $P_d$ results in the staircase waveform voltage $E_{sb}$ shown in FIG. 5E. The staircase waveform voltage $E_{sa}$ is supplied as one component of the correction voltage $E_{ca}$ to electrostriction element 21A upon which head 11A is mounted. This component is supplied via an adder circuit 104A and an amplifier 105A. The purpose of adder circuit 104A will be described below. Similarly, the staircase waveform voltage component $E_{sb}$ of correction voltage $E_{cd}$ is supplied to the electrostriction element 21B, upon which head 11B is mounted, via adder circuit 104B and amplifier 105B.

Although the circuitry which has been shown and described for producing the staircase waveform voltages $E_{sa}$ and $E_{sb}$ includes a digital-to-analog converter for converting the count of counter 101 prior to the sampling of the converted sawtooth voltage $E_k$, it is appreciated that, if desired, the count of counter 101 first may be sampled by sampling pulses $P_a$ and $P_b$, and then each sampled digital count may be converted by a respective digital-to-analog converter to produce the staircase waveform voltages $E_{sa}$ and $E_{sb}$.

It is seen that, regardless of the speed at which tape 1 is moved, counter 101 will be incremented to produce the same counts during the interval between adjacent control pulses $P_c$. Hence, the peak-to-peak amplitude of sawtooth voltage $E_k$, as produced by D/A converter 102, will be constant regardless of the tape speed. Of course, the period of each sawtooth waveform is dependent upon the frequency at which tape speed pulses $P_f$ are produced, and thus dependent upon the speed N of tape 1.

Tracking control circuit 100 also includes a counter control circuit 110 which is adapted to advance the phase of sawtooth voltage $E_k$ by one head field period, relative to the time of occurrence of the reproduced control pulse $P_c$, as discussed hereinabove with respect to FIGS. 5A–5E. Of course, the number of tape speed pulses $P_f$ which are generated during one head field period is a function of the speed N of tape 1. For the slow-motion mode of reproduction, that is, when $N<1$, the slower the tape speed, the smaller the number of tape speed pulses which are produced in one head field period. If, as shown in FIG. 5D, the count of counter 1 should be reset to an initial count of, for example, 0 at one head field period prior to the occurrence of a control pulse $P_c$, then the count of counter 101 should be equal to the number of tape speed pulses which are generated during one head field period at the time of occurrence of the control pulse $P_c$. Counter control circuit 110 is adapted to reset counter 101 at the appropriate time so as to effectively phase-advance the sawtooth voltage $E_k$ by one head field period, regardless of the speed N of tape 1.

Counter control circuit 110 includes a frequency discriminator 111, an analog-to-digital (A/D) converter 120 and a counter reset circuit including a programmable counter 115, a flip-flop circuit 116 and a differentiating circuit 117. Frequency discriminator 111 is a so-called pulse count type of discriminator comprised of, for example, a monostable multi-vibrator and an integrator. The frequency discriminator is adapted to produce a speed voltage $E_f$ having a level, such as a DC level, corresponding to the frequency of tape speed pulses $P_f$. Thus, speed voltage $E_f$ represents the actual speed of tape 1. A/D converter 120 is adapted to convert this speed voltage $E_f$ to a corresponding digital signal. To this effect, A/D converter 120 includes a voltage comparator 121, an oscillator 122, a counter 123, a D/A converter 124, and a latch circuit 126. Oscillator 122 is adapted to supply timing pulses of predetermined frequency to counter 123. The counter is, for example, a count-to-64 counter and counts the timing pulses supplied thereto by oscillator 122 until a count of 64 is obtained. At that count, counter 123 resets itself to resume the counting of the timing pulses. The count of counter 123 is supplied to D/A converter 124 and also to latch circuit 126. The D/A converter converts the changing count of counter 123 to a corresponding analog voltage. This analog voltage is supplied to one input of voltage comparator 121, the voltage comparator including another input supplied with speed voltage $E_f$. When the voltages provided at both inputs of the voltage comparator are equal, an output pulse is generated, this output pulse being supplied to latch circuit 126 and, through a delay circuit 125, to the reset input of counter 123. When a latch pulse is received by latch circuit 126, the count then supplied thereto by counter 123 is latched therein.

The manner in which A/D converter 120 operates will best be understood by reference to the waveform diagram shown in FIGS. 14A–14E. FIG. 14A represents the timing pulses supplied to counter 123 by oscillator 122. As the count of counter 123 is incremented, the digital count thereof is converted to an analog voltage $E_a$ by D/A converter 124. This analog voltage $E_a$ exhibits a staircase waveform, as shown in FIG. 14B. Voltage comparator 121 compares the step-wise increasing analog voltage $E_a$ to the constant level speed voltage $E_f$, as shown in FIG. 14C. When a voltage comparison is obtained, that is, when the level of the analog voltage $E_a$ is equal to the speed voltage $E_f$, latch pulse $P_e$ is produced by the comparator. This latch pulse, shown in FIG. 14D, is supplied to latch circuit 126 which responds thereto to latch the count then present in counter 123. It is appreciated that this count is the digital representation of the analog speed voltage $E_f$. At a delayed time determined by delay circuit 125, for example, at the next following timing pulse, a delay pulse $P_d$ is supplied to counter 123 to reset the latter to its initial count, as shown in FIG. 14C. In this manner, latch circuit 126 stores a digital representation, in the form of a digital count, of the actual speed of tape 1.

As one example thereof, the frequency of the timing pulses generated by oscillator 122 may be on the order of about 119 KHz.

Figure 13A:
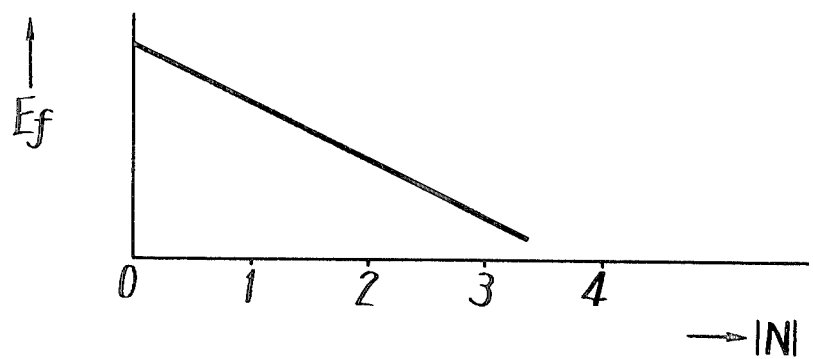
Figure 13B:
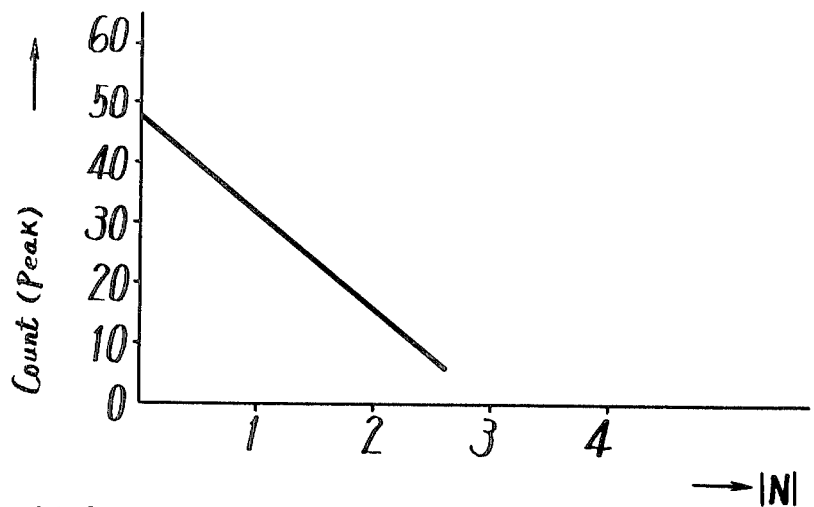
Figure 13C:
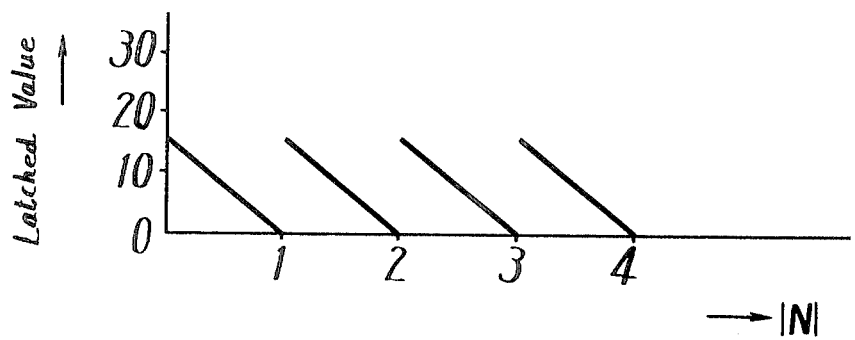

FIG. 13A is a graphical representation of the speed N at which tape 1 is driven and the level of speed voltage $E_f$. It is seen that, as the tape speed is increased, the level of the speed voltage is reduced. FIG. 13B is a graphical representation of the relationship between tape speed N and a digital count representation of speed voltage $E_f$. When $N=0$, the digital count corresponding to speed voltage $E_f$ is equal to "48". When $N=1$, the digital count corresponding to the tape speed is equal to "32". When $N=2$, the digital count corresponding to the tape speed is equal to "16". It may be appreciated that, in a typical binary counter, the four least significant bits in the count corresponding to tape speed $E_f$ will be the same for changing tape speed when $0<N<1$, and also for $1<N<2$, and also for $2<N<3$, and so on. Thus, rather than store the entire count obtained by counter 123 at the time that latch pulse $P_e$ is generated, it is sufficient to store that portion of the count represented by the four least significant bits. Thus, the four least significant bits of counter 123 are supplied to latch circuit 126, and the binary values of these bits are stored in the latch circuit in response to latch pulse $P_e$. The contents of latch circuit 126 are represented in FIG. 13C for different tape speeds N.

Programmable counter 115 is supplied with the count stored in latch circuit 126 and is further supplied with the tape speed pulses $P_f$. The programmable counter is adapted to count the tape speed pulses until the programmed count, corresponding to the count supplied thereto by latch circuit 126, is reached and at that time, programmable counter 115 generates a carry pulse $P_u$ and, moveover, is reset to an initial count to resume counting the tape speed pulses. Thus, it is recognized that programmable counter 115 functions as a programmable frequency divider to divide the frequency of the tape speed pulses $P_f$ by a dividing ratio determined by the count supplied thereto by latch circuit 126. Since this dividing ratio is a function of the actual speed at which tape 1 is driven, it is appreciated that the time of occurrence of carry pulse $P_u$ also is a function of the tape speed. Programmable counter 115 additionally includes a reset input connected to amplifier 44 for receiving control pulses $P_c$ which function to reset the programmable counter to its initial count. Thus, the time of occurrence of control pulse $P_c$ may be considered to be a reference time, and the time of occurrence of carry pulse $P_u$ following the occurrence of control pulse $P_c$ is a function of the tape speed.

The carry pulse $P_u$ generated by programmable counter 115 is supplied to the set input of flip-flop circuit 116. The reset input of this flip-flop circuit is supplied with control pulses $P_c$. Thus, flip-flop circuit 116 is adapted to be set and reset by carry pulse $P_u$ and control pulse $P_c$, respectively. As a result of this operation, flip-flop circuit 116 generates an output signal $S_i$ whose positive transitions are differentiated by differentiating circuit 117 to generate a reset pulse $P_i$.

Let it be assumed that the count stored in latch circuit 126 and supplied to programmable counter 115 establishes a frequency dividing ratio of "X". This means that after "X" tape speed pulse $P_f$ are counted, the programmable counter generates the carry pulse $P_u$. Furthermore, since the programmable counter always is reset by the control pulse $P_c$, it is seen, from FIGS. 15A and 15B, that carry pulse $P_u$ is generated at a time following the control pulse $P_c$ that is determined by the dividing ratio "X". This dividing ratio is, of course, a function of the tape speed. The carry pulse $P_u$ sets flip-flop circuit 116 and the control circuit $P_c$ resets this flip-flop circuit, resulting in the output signal $S_i$, shown in FIG. 15C. Each positive transition in the output signal $S_i$ is differentiated and supplied as a reset pulse $P_i$ to counter 101. Thus, the count of counter 101 is reset to its initial count in response to each reset pulse $P_i$. This results in phase-advancing the sawtooth voltage $E_k$ derived from the count of counter 101 by one head field period relative to the control pulse $P_c$, as shown by the solid sawtooth voltage in FIG. 15E. The broken sawtooth voltage is that which would be produced if counter 101 is reset in response to control pulses $P_c$.

It is seen from FIGS. 15A, 15B and 15E, that the resetting of counter 101 actually is delayed from control pulse $P_c$ by an amount determined by the dividing ration "X" of programmable counter 115. This delay is sufficient to result in an effective phase-advance of the sawtooth voltage. Furthermore, since the time of occurrence of the reset pulse $P_i$ is a function of the actual speed at which tape 1 is driven, the resetting of counter 101 likewise is controlled in accordance with this tape speed. Hence, the effective phase-advance of the sawtooth voltage will be equal to one head field period, even though the number of tape speed pulses $P_f$ which is generated during a head field period varies as a function of the tape speed. This all is taken into account by the operation of counter 123, latch circuit 126, programmable counter 115 and flip-flop circuit 116. The delay between control pulse $P_c$ and reset pulse $P_i$ corresponds to the count delay shown in FIG. 6C, this delay being a function of tape speed N.

As an example, as mentioned above, if $N=1/5$, then about three tape speed pulses $P_f$ are generated in one head field interval. At this tape speed ($N=1/5$), the digital count corresponding thereto, as stored in latch circuit 126 may set programmable counter 115 with a dividing ratio equal to 13. Consequently, after being reset by a control pulse $P_c$, programmable counter 115 counts 13 tape speed pulses $P_f$ and then generates the carry pulse $P_u$. Hence, the carry pulse is generated at a delayed time corresponding to 13 tape speed pulses. At this time, differentiating circuit 117 generates the reset pulse $P_i$ to reset the count of counter 101. As shown in FIG. 15E, counter 101 is reset at a time corresponding to 13 tape speed pulses following the occurrence of control pulse $P_c$. This means that the sawtooth voltage $E_k$ derived from the counter 101 is phase-advanced, relative to the control pulse $P_c$, by an amount equal to about three tape speed pulses. In the present example wherein $N=1/5$, this is equal to one head field period.

The foregoing has described the manner in which the level steps of the staircase waveform voltage component $E_{sa}$, $E_{sb}$ of correction voltage $E_{ca}$, $E_{cb}$ is produced. It is recalled that this correction voltage also includes a sawtooth waveform voltage component $E_n$. More particularly, and as now will be described, the correction voltage $E_{ca}$ which is supplied to displaceable support member 21A includes a sawtooth waveform voltage component $E_{na}$, and correction voltage $E_{cb}$ which is supplied to displaceable support member 21B is provided with a sawtooth waveform voltage component $E_{nb}$. These sawtooth waveform voltage components are generated by sawtooth waveform circuit 150. This sawtooth waveform circuit includes an OR circuit 151, a sawtooth generator 152, a sample-and-hold circuit 153 and a change-over switch 154. OR circuit 151 is connected to receive head position pulses $P_{ga}$ and $P_{gb}$, produced by pulse generators 46 and 76, respectively. Head position pulses $P_{ga}$ and $P_{gb}$ are produced at the head frame rate, and OR circuit 151 combines these position pulses to produce head position pulses $P_g$ at the head field rate. These head position pulses are supplied to sawtooth generator 152 to trigger the sawtooth generator to produce the sawtooth waveform voltage $E_n$, described previously with respect to FIGS. 2D and 3D. The output of sawtooth generator 152 is connected through a difference amplifier 161, described in greater detail below, to sample-and-hold circuit 153 and, additionally, directly to one set of inputs of change-over switch 154. Sample-and-hold circuit 153 is connected to OR circuit 151 to receive head position pulses $P_g$ as sampling pulses. It may be appreciated that the sample-and-hold circuit is adapted to sample the amplitude of the sawtooth waveform voltage $E_n$ supplied thereto by sawtooth generator 152 at the beginning of each scanning trace. The sampled amplitude of the sawtooth waveform voltage is supplied to another set of inputs of change-over switch 154. The change-over switch is shown schematically as a mechanical switch having a pair of movable contacts, each movable contact being selectively engageable with one or another of a respective pair of fixed contacts. The switching condition of change-over switch 154 is determined by the rectangular wave signal $S_v$ which is supplied thereto as a switching signal. One movable contact of the change-over switch is connected to an input of adder circuit 104A, and the other movable contact of the change-over switch is connected to an input of adder circuit 104B.

Sawtooth waveform circuit 150 also is coupled to a level correcting circuit 160, the latter being comprised of difference amplifier 161, a sample-and-hold circuit 162 and a difference amplifier 163. The purpose of level correcting circuit 160 is to adjust the DC, or average, level of the sawtooth waveform voltage $E_n$ produced by sawtooth generator 152 as a function of the detected deviation between the scanning path of each head 11A and 11B and the record track which is scanned thereby. As will be described below, the signal reproducing apparatus shown in FIG. 8 includes a closed loop correction circuit 200 which serves to detect when the average path traversed by a head deviates from the center-line of the record track being scanned. Although the tracking control circuit described herein is adapted to correct for tracking errors between the scanning traces of the heads and the record track being scanned, other tracking errors may arise due to, for example, tape shrinkage, tape stretching, or different characteristics of the VTR which is used for a reproducing operation than that which is used for a recording operation. As will be described, such tracking errors are corrected by closed loop correction circuit 200. This closed loop correction circuit is adapted to produce an error correcting voltage, and this error correcting voltage is supplied as a reference voltage $E_r$ to one input of difference amplifier 163. For the purpose of simplification, this reference voltage $E_r$ is shown as being produced by a reference voltage source 164.

Difference amplifier 161 includes a positive (+) input connected to sawtooth generator 152 to receive the sawtooth waveform voltage $E_n$ therefrom, and a negative input (−) connected to receive the output of difference amplifier 163. As mentioned above, difference amplifier 163 is supplied with the reference voltage $E_r$ at its negative (−) input and has its positive (+) input connected to the output of sample-and-hold circuit 162. This sample-and-hold circuit is adapted to sample the sawtooth waveform voltage $E_n$ at the midpoint of each period. To this effect, sample-and-hold circuit 162 is supplied with sampling pulses $P_m$ of the head field rate, these sampling pulses being produced by OR-circuit 165, as described above, It is recalled, from FIG. 12E, that sampling pulses $P_m$ are produced at the middle portion of each trace of heads 11A and 11B.

Let it be assumed that the average level of the sawtooth waveform voltage $E_n$ is greater than the reference voltage $E_r$. This average level is sampled by sample-and-hold circuit 162 and compared in difference amplifier 163 to the reference voltage $E_r$. Since it has been assumed that the average level of the sawtooth waveform voltage exceeds the reference voltage, difference amplifier 163 supplies the difference therebetween to the negative input (−) of difference amplifier 161. Hence, the average level of the sawtooth waveform voltage $E_n$ is reduced accordingly so as to be equal to the reference voltage. If, on the other hand, the average level of the sawtooth waveform voltage had been less than the reference voltage $E_r$, difference amplifier 163 supplies a negative voltage level to the negative (−) input of difference amplifier 161, resulting in an increase in the average level of the sawtooth waveform voltage. Thus, level correcting circuit 160 functions to insure that the average level of the sawtooth waveform voltage $E_n$ is equal to the reference voltage $E_r$. As will be described below, this reference voltage $E_r$ is equal to the error correcting voltage which is needed to make the average path of heads 11A and 11B coincide with the tracks being scanned thereby.

Referring to FIGS. 16A–16H, the manner in which sawtooth waveform circuit 150 operates now will be described. Let it be assumed that the head position pulses $P_g$ appear as shown in FIG. 16A. In the following explanation, reference is made to the left-hand portion of the drawing figures wherein $N<1$. As will be described below with respect to FIG. 18, each head position pulse $P_g$ triggers sawtooth generator 152 to generate the sawtooth waveform voltage $E_n$. Since it is assumed that $N<1$, the slope of the sawtooth waveform voltage is seen to be negative.

After passing through difference amplifier 161 so as to have its average level corrected, the sawtooth waveform voltage $E_n$ whose average level is equal to the reference voltage $E_r$, as shown in FIG. 16D, is sampled in sample-and-hold circuit 153 by head position pulses $P_g$. It is appreciated that these head position pulses $P_g$ occur at the beginning, or maximum amplitude, of the sawtooth waveform voltage. Thus, sample-and-hold circuit 153 supplies the peak of the sawtooth amplitude voltage $E_p$, shown in FIG. 16E, to one set of inputs of change-over switch 154.

The rectangular wave signal $S_v$, shown again in FIG. 16F, is assumed to operate change-over switch 154 such that, when the rectangular wave signal is at its relatively higher level, the change-over switch supplies the level-corrected sawtooth waveform voltage $E_n$ to adder circuit 104A, and also supplies the sampled sawtooth amplitude $E_p$ to adder circuit 104B. Conversely, when the rectangular wave signal $S_v$ is at its relatively lower level, change-over switch 154 supplies the sampled sawtooth amplitude $E_p$ to adder circuit 104A, and also supplies the level-corrected sawtooth waveform voltage $E_n$ to adder circuit 104B. The voltage which is supplied by change-over switch 154 to adder circuit 104A is the sawtooth waveform voltage $E_{na}$, shown in FIG. 16G, and the voltage which is supplied to adder circuit 104B by the change-over switch is the sawtooth waveform voltage $E_{nb}$, shown in FIG. 16H. It may be recognized that, when head 11A scans tape 1, the sawtooth waveform voltage $E_{na}$ is supplied to adder circuit 104A. Similarly, when head 11B scans tape 1, the sawtooth waveform voltage $E_{nb}$ is supplied to adder circuit 104B. Consequently, during the scanning trace of each head, a sawtooth waveform voltage component of the correction voltage $E_c$ is supplied to the displaceable support member upon which that head is mounted.

In the foregoing description, it has been assumed that $N<1$. However, if $N>1$, then the sawtooth waveform voltage $E_n$ exhibits a positive slope, as shown in the right-hand portion of FIGS. 16B, 16D and 16E. Also, since the amplitude of the sawtooth waveform voltage at the time of occurrence of each head position pulse $P_g$ is at its minimum level, the sampled sawtooth amplitude produced by sample-and-hold circuit 153 appears as the lower DC level $E_p$, shown in the right-hand portion of FIG. 16E. It is recognized that the sawtooth waveform voltage $E_{na}$, supplied to adder circuit 104A when head 11A scans tape 1, is as shown in the right-hand portion of FIG. 16G; and the sawtooth waveform voltage $E_{nb}$ supplied to adder circuit 104B when head 11B scans tape 1 is as shown in the right-portion of FIG. 16H.

A waveform representation of the manner in which correction voltages $E_{ca}$ and $E_{cb}$ are produced by summing the respective staircase waveform voltages and sawtooth waveform voltages is depicted in FIGS. 17A–17F. FIG. 17A represents the staircase waveform voltage $E_{sa}$ which is produced by sample-and-hold circuit 103A. This staircase waveform voltage is recognized to be identical to the staircase waveform voltage described above with respect to FIG. 5D. Similarly, FIG. 17B illustrates the staircase waveform voltage $E_{sb}$ produced by sample-and-hold circuit 103B. This staircase waveform voltage is recognized to be identical to the staircase waveform voltage shown in FIG. 5E and discussed above. This, it is recalled that each step-level of, for example, the staircase waveform voltage $E_{sa}$ is produced by sampling the sawtooth voltage $E_k$ produced by D/A converter 102 each time that head 11B reaches the middle portion of its scanning trace. That is, each step-level is produced at approximately one-half of a head field period prior to the time that head 11A commences its scanning trace. Similarly, each step-level in the staircase waveform voltage $E_{sb}$ is produced one-half of a head field period prior to the time that head 11B commences its scanning trace. The bold lines in FIGS. 17A and 17B represent the actual scanning times of heads 11A and 11B, respectively.

FIG. 17C illustrates the sawtooth waveform voltage $E_{na}$ supplied to adder circuit 104A by change-over switch 154, and described previously with respect to FIG. 16G. Similarly, FIG. 17D illustrates the sawtooth waveform voltage $E_{nb}$, discussed previously with respect to FIG. 16H, which is supplied to adder circuit 104B by change-over switch 154. Adder circuit 104A sums the staircase waveform voltage $E_{sa}$ and the sawtooth waveform voltage $E_{na}$ to produce the error correction voltage $E_{ca}$, shown in FIG. 17E. The staircase waveform voltage $E_{sa}$ is superimposed onto FIG. 17E, shown by the broken lines. The bold lines in FIG. 17E represent the correction voltage $E_{ca}$ that is applied to displaceable support member 21A at the time that head 11A scans tape 1. It is appreciated that the DC level, or average level, of the sawtooth waveform component in this correction voltage changes as the step-level of the staircase waveform component changes. The correction voltage $E_{ca}$, represented by the broad lines of FIG. 17E, is seen to correspond to the correction voltage $E_c$ shown in FIG. 2B. Thus, this correction voltage $E_{ca}$ corrects the deviation d of each scanning trace formed by head 11A relative to the record track which then is being scanned.

Similarly, the error correction voltage $E_{cb}$ which is produced by adder circuit 104B is obtained by summing the staircase waveform voltage $E_{sb}$ and the sawtooth waveform voltage $E_{nb}$. In FIG. 17F, the staircase waveform voltage $E_{sb}$ is superimposed, as shown by the broken lines. The bold lines of the error correction voltage of FIG. 17F represent the error correction voltage which is supplied to displaceable support member 21B at the time that head 11B scans tape 1. It is appreciated that the average, or DC level of the sawtooth waveform component in this error correction voltage changes as the step-level of the staircase waveform component changes. Error correction voltage $E_{cb}$ is seen to be the same as the error correction voltage $E_c$ shown in FIG. 2B. Hence, the deviation of each scanning trace formed by head 11B relative to the record track which is scanned by this head (wherein $N \neq 1$) is corrected.

Figure 18:
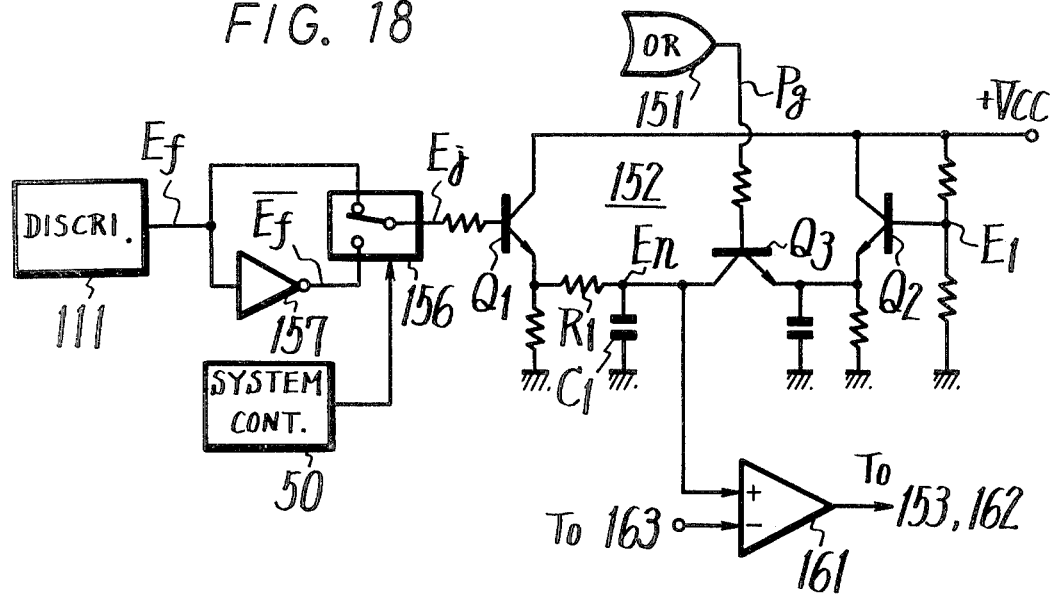
FIG. 18 is a schematic diagram of one embodiment of a sawtooth signal generator which is used with the present invention.

A preferred embodiment of sawtooth generator 152 is shown schematically in FIG. 18. The sawtooth generator includes a capacitor $C_1$, a charge/discharge transistor $Q_1$, a reference transistor $Q_2$ and a switching transistor $Q_3$. Transistors $Q_1$ and $Q_2$ both are connected in emitter-follower configuration, and the emitter electrode of transistor $Q_1$ is connected via a resistor $R_1$ to capacitor $C_1$. The emitter electrode of transistor $Q_2$ is connected to capacitor $C_1$ via the collector-emitter circuit of transistor $Q_3$. The base electrode of transistor $Q_1$ is connected to be supplied with a voltage $E_j$ which, as will be described, has a magnitude that represents both the speed and direction of movement of tape 1. The base electrode of transistor $Q_2$ is supplied with a reference voltage $E_1$, this reference voltage being equal to the magnitude of voltage $E_j$ when $N=1$.

The voltage $E_j$ is produced by a change-over switch 156 having one fixed input thereof connected to receive the speed voltage $E_f$ produced by frequency discriminator 111, described above with respect to FIG. 9. The other fixed input of change-over switch 156 is connected to receive an inverted version $\overline{E}_f$ of the speed voltage, this inverted version being produced by an inverting circuit 157. Change-over switch 156 is schematically illustrated as a mechanical switch whose movable contact is controlled by operation control circuit 50 to receive the inverted version $\overline{E}_f$ of the speed voltage during forward tape movement (i.e., $N>0$), and to receive speed voltage $E_f$ during reverse tape movement (i.e., $N<0$).

The operation of sawtooth generator 152, shown in FIG. 18, now will be described with reference to the graphical representation of FIG. 19. Speed voltage $E_f$, produced by frequency discriminator 111, is related to the speed N of tape 1 as represented by the broken line. It is recalled that this graphical representation of the speed voltage has been discussed above with respect to FIG. 13A. The inverted version $\overline{E}_f$ of the speed voltage, as produced by inverting circuit 157, is represented by the chain line in FIG. 19. It is appreciated that, when $N=0$, speed voltage $E_f$, and the inverted version $\overline{E}_f$ thereof, are of equal magnitude. However, as N increases, the magnitude of the speed voltage $E_f$ decreases; whereas the magnitude of the inverted version $\overline{E}_f$ thereof increases.

During forward tape movement, operation control circuit 50 controls change-over switch 156 to supply the inverted version $\overline{E}_f$ of the speed voltage to the base electrode of transistor $Q_1$. During reverse tape movement, the operation control circuit controls the change-over switch to supply the speed voltage $E_f$ to transistor $Q_1$. Hence, the voltage $E_j$ which is supplied to the base electrode of transistor $Q_1$ by change-over switch 156 is represented by the solid line in FIG. 19.

Figure 19:
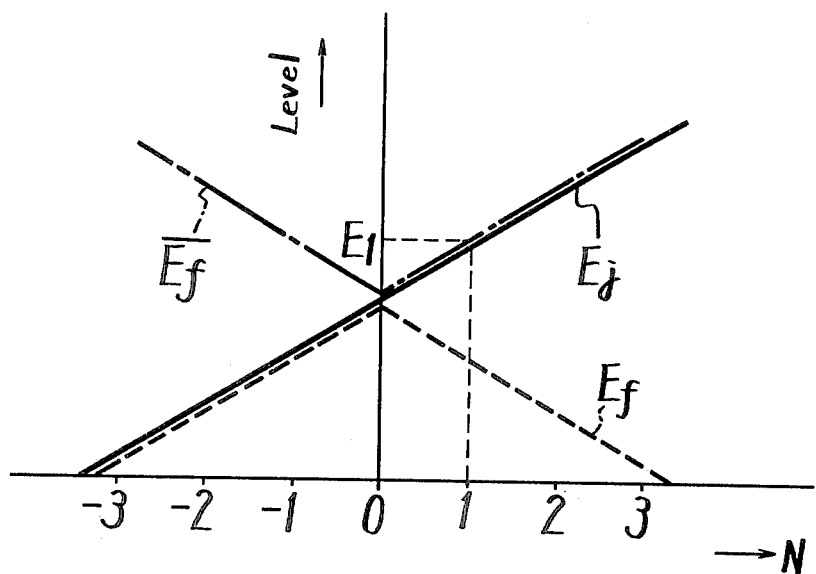
FIG. 19 is a graphical representation which is useful in understanding the operation of the circuit shown in FIG. 18.

The magnitude of the voltage $E_j$ when $N=1$ is shown in FIG. 19 to be equal to $E_1$. This voltage $E_1$ is supplied as a reference voltage to the base electrode of transistor $Q_2$, such as by a voltage divider circuit. If the base-emitter losses of transistors $Q_1$ and $Q_2$ are ignored, it is appreciated that the emitter voltages of these transistors are equal to $E_j$ and $E_1$, respectively.

At the beginning of each head field period, that is, at the beginning of each scanning trace, OR circuit 151 supplies a head position pulse $P_g$ to the base electrode of transistor $Q_3$. These head position pulses have been discussed previously with respect to FIG. 16A. Transistor $Q_3$ is rendered conductive in response to each head position pulse $P_g$ such that its collector-emitter path promptly charges capacitor $C_1$ with the reference voltage $E_1$ provided at the emitter electrode of transistor $Q_2$. Transistor $Q_3$ thereafter is returned to its non-conductive state, awaiting the next occurrence of a head position pulse $P_g$. While this transistor is non-conductive, the voltage across capacitor $C_1$ changes toward the voltage $E_j$ provided at the emitter electrode of transistor $Q_1$. For example, if the tape is moved in its slow motion mode ($N<1$), then the voltage $E_j$ at the emitter electrode of transistor $Q_1$ is less than the voltage $E_1$ to which capacitor $C_1$ has been charged. Consequently, this charged voltage now discharges through resistor $R_1$. If the voltage across capacitor $C_1$ is used as the sawtooth waveform voltage $E_n$, it is appreciated that this sawtooth waveform exhibits a negative slope when $N<1$. Conversely, when the tape is moved in its fast motion mode ($N>1$), the voltage $E_j$ at the emitter electrode of transistor $Q_1$ is greater than the reference voltage $E_1$ to which capacitor $C_1$ has been charged. Thus, the capacitor now is charged through resistor $R_1$; whereby the sawtooth waveform of this voltage exhibits a positive slope.

Although capacitor $C_1$ always is charged to the level $E_1$ at the beginning of each scanning trace, the level to which it gradually is charged or discharged is a function of the voltage $E_j$ which, in turn, is determined by the actual speed at which the tape is driven. That is, for the slow motion mode, capacitor $C_1$ is discharged from its initial level of $E_1$ to a level which is a function of the voltage $E_j$. Conversely, for the fast motion mode, capacitor $C_1$ is charged from its initial level of $E_1$ to a higher level that is a function of the voltage $E_j$. Thus, it is seen that the peak-to-peak amplitude of the sawtooth waveform voltage $E_n$ produced by capacitor $C_1$ is related to the tape speed in the manner graphically represented by FIG. 7.

Returning now to FIG. 9, it is seen that, in addition to tracking control circuit 100 which supplies correction voltages $E_{ca}$ and $E_{cb}$ to displaceable support members 21A and 21B, a closed loop correction circuit 200 also is provided to supply tracking error voltages to the displaceable support members. This closed loop correction circuit is shown in greater detail in FIG. 8. Closed loop correction circuit 200 is comprised of an oscillator 201, an envelope detecting circuit including a tuned amplifier 202, a sample-and-hold circuit 203 and a tuned amplifier 205, a synchronous detector 206 and sample-and-hold circuits 208A and 208B.

Figure 20:
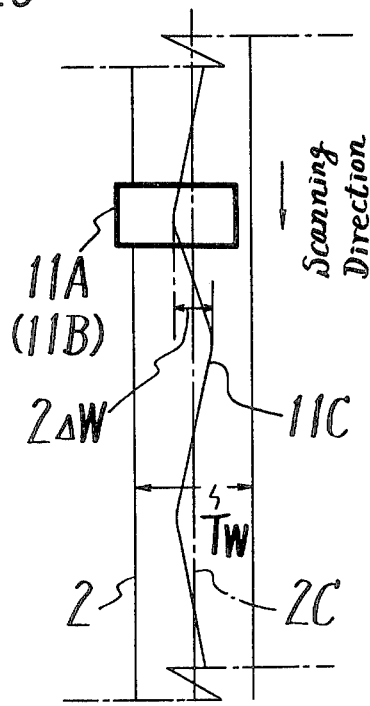
FIG. 20 is a schematic representation of the operation of the closed loop head tracking correcting feature of the present invention.

Oscillator 201 is adapted to generate an oscillating signal whose frequency is on the order of about 450 Hz. This oscillating signal is supplied to displaceable support members 21A and 21B via adder circuits 104A and 104B, respectively, for the purpose of vibrating the displaceable support members, resulting in the dithering of heads 11A and 11B from side-to-side across a record track being scanned thereby. Referring to FIG. 20, it is seen that, as the head 11A (or 11B) vibrates, or dithers, relative to track 2, the center of the head oscillates relative to the center line of the track with a peak-to-peak amplitude of $2\Delta w$, wherein $\Delta w$ is on the order of about 10% of the width $T_w$ of the track. As a result of this dithering of the head, the envelope of the FM video signal reproduced thereby exhibits an amplitude modulation component. Of course, this amplitude modulation is removed from the reproduced video signal by limiter 14 included in signal reproducing section 10.

Tuned amplifier 202 is connected to receive the reproduced FM video signal $S_f$ having the amplitude modulated envelope. The tuned amplifier is tuned to the FM frequency corresponding to the frequency modulated horizontal synchronizing pulse. Thus, tuned amplifier 202 particularly amplifies the FM horizontal synchronizing pulse $S_t$ whose envelope is amplitude modulated because of the dithering of the heads. This amplified FM horizontal synchronizing pulse $S_t$ is supplied to sample-and-hold circuit 203. A synchronizing separator circuit 204 is connected to video output terminal 17 of signal reproducing section 10 and is adapted to separate the horizontal synchronizing pulses $P_h$ from the demodulated video signal. These separated horizontal synchronizing pulses $P_h$ are supplied as sampling pulses to sample-and-hold circuit 203. Thus, the sample-and-hold circuit samples the FM horizontal synchronizing pulses $S_t$ to produce the sampled horizontal synchronizing pulse $S_h$, which appears as a burst of frequency corresponding to the FM frequency which had been selected to modulate the originally recorded horizontal synchronizing pulse. The samples of the FM horizontal synchronizing pulse $S_h$ exhibit an envelope which is amplitude modulated in accordance with the dithering of the heads. This amplitude modulation of the envelope of the sampled FM horizontal synchronizing pulses is, of course, determined by the frequency of the oscillating signal generated by oscillator 201 and supplied via adder circuits 104A and 104B to displaceable support members 21A and 21B.

The samples of the FM horizontal synchronizing pulses produced by sample-and-hold circuit 203 are supplied to synchronous detector 206 by tuned amplifier 205, the latter being tuned to the dithering frequency of 450Hz. Thus, the tuned amplifier supplies the envelope of the samples of the FM horizontal synchronizing pulses to the synchronous detector. In addition to this envelope, synchronous detector 206 receives the oscillating signal generated by oscillator 201, which is supplied thereto by a phase shift circuit 207. This oscillating signal is used to synchronously detect the envelope of the samples of the FM horizontal synchronizing pulses $S_h$ so as to produce a tracking error voltage $E_w$. The level of this tracking error voltage represents the deviation of the average path traversed by head 11A (or 11B) from the center line of track 2, shown in FIG. 20.

The tracking error voltage $E_w$ produced by synchronous detector 206, and representative of the tracking error of heads 11A and 11B, is supplied to sample-and-hold circuits 208A and 208B. The rectangular wave signal $S_y$ is supplied as a sampling signal to sample-and-hold circuit 208A; and the inverted version $\overline{S}_y$ of this rectangular wave signal is supplied as a sampling signal to sample-and-hold circuit 208B. From FIG. 12B, it is seen that sample-and-hold circuit 208A samples the tracking error voltage $E_w$ during each head field period that head 11A scans tape 1, so as to supply the tracking error voltage $E_{wa}$ associated with head 11A to displaceable support member 21A. Similarly, sample-and-hold circuit 208B samples the tracking error voltge $E_w$ during each head field period that head 11B scans tape 1 so as to supply the tracking error voltage $E_{wb}$ associated with head 11B to displaceable support member 21B.

Figure 21:
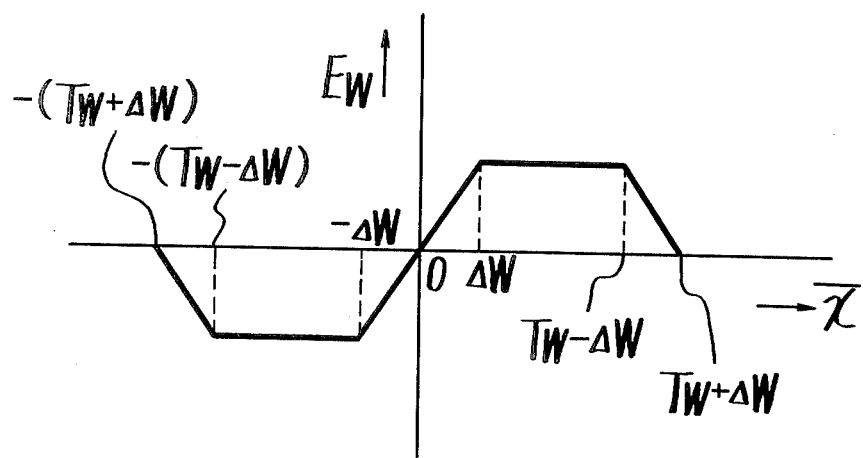
FIG. 21 is a graphical representation showing the relationship between the deviation of the scanning trace of a reproducing head and the error signal produced in response thereto.

If the average path traversed by each of heads 11A and 11B is represented as $\overline{x}$, then the tracking error voltage $E_w$ which is supplied to sample-and-hold circuits 208A and 208B is a function of this average path in accordance with the graphical representation shown in FIG. 21. This tracking voltage is supplied as a correcting voltage to the respective displaceable support members so as to bring the average path traversed by each head into coincidence with the center line of each track being scanned.

As mentioned above with respect to level correcting circuit 160, the reference voltage $E_r$ supplied to difference amplifier 163 corresponds to the tracking error voltage $E_w$.

It now should be apparent that the present invention serves to control the scanning traces of each head such that, regardless of the speed at which the tape is driven the previously recorded record tracks are scanned accurately. The correction voltage $E_c$ which is supplied to the displaceable support members upon which the respective heads are mounted is a function of the speed at which the tape is driven. Moreover, a closed loop correction circuit also is provided to make sure that each head correctly scans a record track despite changes that might take place in the physical characteristics of the tape or the operating parameters of the VTR' which are used.

In the foregoing description, it has been assumed that the video signals recorded on tape 1 are monochrome (or black-and-white) video signals. It should be readily appreciated that the recorded video signals may consist of composite color video signals, such as an FM color video signal or a color video signal in which the chrominance component is frequency-converted to a relatively lower band and the luminance component is frequency modulated to a relatively higher band. If the recorded video signal is a color video signal, then the dithering frequency of the heads, that is, the frequency of the oscillating signal generated by oscillator 201 of closed loop correction circuit 200, should be equal to an odd multiple of one-half the field frequency. With this dithering frequency, even though the amplitude of the reproduced video signals changes as a function of the dithering of the heads, resulting in an irregular density of the color saturation, this irregularity is cancelled out by reason of the fact that the fields are interleaved. Hence, the irregular density is not perceived by a viewer.

Furthermore, in recording the video signals, heads 11A and 11B may exhibit different azimuth angles such that the alternate record tracks that are recorded thereby are recorded with different azimuth angles. For proper reproduction, the reproducing heads should exhibit the same azimuth angles as those heads which were used to record the respective tracks.

While the present invention has been particularly shown and described with reference to a preferred embodiment, it should be readily apparent to those of ordinary skill in the art that various changes and modifications in form and details may be made without departing from the spirit and scope of the invention. For example, frequency generator 34 may be constituted by a separate longitudinal track on tape 1 having clock signals recorded therein. These clock signals are reproduced as tape speed pulses $P_f$ having a frequency which is directly related to the speed at which the tape is driven. Furthermore, although the recording medium with which the present invention is used has been described herein as a magnetic tape, it should be appreciated that any other movable recording medium containing signals which are recorded in parallel tracks can be used. For example, the recording medium may be a magnetic sheet or an optical recording medium. It is intended that the appended claims be interpreted as including the foregoing as well as other such changes and modifications.

What is claimed is:

1. In a signal reproducing system of the type having rotary transducer means for scanning traces across a movable record medium to reproduce signals from previously recorded record tracks, and displaceable support means for supporting said transducer means and responsive to control signals to displace said transducer means relative to said record tracks, and wherein said record medium is movable at a speed which may result in a tracking error deviation of the scanning traces of said transducer means from said record tracks, apparatus for generating said control signals, comprising frequency generating means for generating speed representing pulses whose frequency is a function of the speed at which said record medium is moved; cyclical counting means for cyclically counting said speed representing pulses; and level generating means for generating a signal level corresponding to the count then present in said counting means at the time that said transducer means advances to the middle portion of a scanning trace.

2. The apparatus of claim 1 wherein said cyclical counting means comprises reset means for periodically resetting the count thereof to an initial count when said record medium is moved to position a record track at a predetermined location.

3. The apparatus of claim 2 wherein said record medium is provided with a control pulse track containing control pulses associated with at least selected ones of said record tracks; and wherein said reset means comprises sensing means for sensing a control pulse, speed detecting means for detecting the speed at which said record medium is moved, reset pulse generating means for generating a reset pulse at a time delayed from the sensing of a control pulse, the delayed time being a function of the detected speed of said record medium, and means for supplying said reset pulse to said cyclical counting means.

4. The apparatus of claim 3 wherein said reset pulse generating means comprises programmable frequency dividing means having a frequency dividing ratio determined by said detected speed of said record medium for dividing the frequency of said speed representing pulses; bistate means coupled to said programmable frequency dividing means to be set to a first state by the frequency-divided speed representing pulses and to be reset to a second state by said sensed control pulses; and means responsive to the setting of said bistate means to the first state thereof to generate said reset pulse.

5. The apparatus of claim 1 wherein said level generating means comprises digital-to-analog converting means coupled to said cyclical counting means for converting the count thereof to an analog signal, said analog signal being a sawtooth signal as the count of said counting means changes; and sampling means for sampling said analog signal each time that said transducer means advances to the middle portion of a scanning trace.

6. The apparatus of claim 5 wherein said signal reproducing system includes transducer position sensing means for sensing when said transducer means rotates into predetermined position with respect to said record medium; and wherein said sampling means comprises sampling pulse generating means responsive to said transducer position sensing means for generating sampling pulses at a time substantially equal to the time that said transducer means advances to the middle portion of a scanning trace thereof, and sample-and-hold means coupled to said digital-to-analog converting means and responsive to said sampling pulses for sampling said analog signal and holding the sampled signal for the interval between successive sampling pulses.

7. The apparatus of claim 5 wherein said cyclical counting means is operative to count to a predetermined count and then reset itself to an initial count to resume the counting of said speed representing pulses.

8. The apparatus of claim 7 wherein the transducer means of said signal reproducing system is comprised of first and second heads for scanning alternate traces across said record medium, each of said heads being supported on a respective displaceable support means, and wherein said record medium is provided with a control track having control pulses recorded therein, each control pulse representing the position of an associated record track, and control pulse sensing means for sensing said control pulses; and wherein said apparatus further comprises first sampling means for sampling said analog signal when said second head advances to the middle portion of a scanning trace and second sampling means for sampling said analog signal when said first head advances to the middle portion of a scanning trace, and reset means for resetting said cyclical counting means to said initial count thereof in advance of a sensed control pulse from said control track of said record medium by a time that is a function of the speed of said record medium.

9. The apparatus of claim 1 further comprising sawtooth signal generating means for generating a sawtooth signal having a period equal to the duration of a scanning trace of said transducer means; and summing means for adding said sawtooth signal to each generated signal level, thereby to produce said control signal.

10. The apparatus of claim 9 wherein said sawtooth signal generating means is operative to generate a sawtooth signal whose maximum amplitude is a function of the speed of said record medium.

11. The apparatus of claim 10 wherein said sawtooth signal genrating means comprises means responsive to said speed representing pulses to provide a speed representing signal whose level represents the speed of said record medium; means for providing a reference level representing the speed at which said record medium was moved to record said video signal in said record tracks; capacitance means for producing said sawtooth signal; and means responsive to the rotation of said transducer means to a predetermined location for promptly supplying said capacitance means with said reference level and thereafter gradually changing the voltage across said capacitance means as a function of the difference between said speed representing signal and said reference level.

12. The apparatus of claim 10 wherein said signal reproducing system includes means for sensing the actual deviation between said transducer means and a record track during each scanning trace of said transducer means; and wherein said sawtooth signal generating means includes adjusting means for adjusting the average level of said sawtooth signal to compensate for said actual deviation.

13. The apparatus of claim 9 wherein said transducer means includes first and second heads for scanning alternate traces across said record medium, each head being supported by a respective displaceable support means, and said signal reproducing system includes first and second position pulse generating means for generating first and second position pulses representing the rotary positions of said first and second heads, respectively; and wherein said apparatus further comprises sampling means for sampling the amplitude of said sawtooth signal at the beginning of each scanning trace of each head, and switching means supplied with said sawtooth signal and with said sampled amplitude and having a first output for providing said sawtooth signal when said first head scans a scanning trace and for providing said sampled amplitude when said second head scans a scanning trace, and a second output for providing said sampled amplitude when said first head scans a scanning trace and for providing said sawtooth signal when said second head scans a scanning trace; and wherein said summing means comprises first and second adding circuits connected to said first and second outputs, respectively, of said switching means, each adding circuit being connected to receive a respective generated signal level.

14. The apparatus of claim 9 further comprising an oscillator for generating an oscillating signal; and means for supplying said oscillating signal to said summing means, whereby said control signals include an oscillatory component which, when supplied to said displaceable support means, causes the latter to vibrate so as to impart dithering to said transducer means.

15. The apparatus of claim 14 further comprising envelope detecting means for detecting the envelope of the signals reproduced by said transducer means during each scanning trace thereof, said envelope being amplitude modulated as a result of the dithering of said transducer means; synchronous detecting means supplied with said envelope and with said oscillating signal to produce a tracking error signal representing the deviation of the average path traversed by said dithering transducer means from the center of a scanned record track; and means for supplying said tracking error signal to said displaceable support means to cancel said deviation.

16. Apparatus for reproducing video signals from parallel skewed tracks on a magnetic tape comprising tape driving means for driving said tape at a speed related to the original signal recording speed by the ratio N, wherein forward tape movement is represented by $+N$ and negative tape movement is represented by $-N$; first and second rotary heads for scanning parallel traces across said tape to reproduce the video signals from said record tracks; head drive means for rotatably driving said first and second heads; first and second displaceable support means for coupling said first and second heads, respectively, to said head drive means, each said displaceable support means being responsive to a control signal applied thereto to displace a respective head in a direction transversely of said trace; head position sensing means for sensing when said first and second heads rotate into predetermined position with respect to said tape; frequency generating means for generating tape speed pulses whose frequency is a function of said ratio N; resettable counting means connected to count said tape speed pulses and reset to an initial count when a predetermined number of said tape speed pulses have been counted, thereby to resume said counting; first level generating means responsive to said head position sensing means to generate first level signals corresponding to the count then reached by said counting means at the time that said second head advances to the middle portion of its trace; second level generating means responsive to said head position sensing means to generate second level signals corresponding to the count then reached by said counting means at the time that said first head advances to the middle portion of its trace; and means for supplying said first and second level signals to said first and second displaceable support means as control signals therefor.

17. The apparatus of claim 16 wherein said magnetic tape includes a control track having control pulses recorded therein, each control pulse having a predetermined positional relationship with respect to a corresponding record track; and further comprising control pulse sensing means for sensing said control pulses and thereby indicate the relative position of said tape, and count control means responsive to a sensed control pulse to provide said resettable counting means with a count at the time of occurrence of said sensed control pulse that is a function of said tape speed.

18. The apparatus of claim 17 wherein said count control means comprises forced reset means for advancing the time that said resettable counting means is reset to said initial count relative to the occurrence of said sensed control pulse.

19. The apparatus of claim 18 wherein said forced reset means comprises frequency discriminating means for producing an analog signal corresponding to the frequency of said tape speed pulses; analog-to-digital conversion means for converting said analog signal to a digital speed representing signal; programmable frequency dividing means for dividing the frequency of said tape speed pulses by a dividing ratio determined by said digital speed representing signal; bistate means having a first state set by the frequency-divided tape speed pulses and a second state reset by the sensed control pulse; and means for resetting said resettable counting means to said initial count when said bistate means is set to said first state thereof.

20. The apparatus of claim 17 further comprising sawtooth signal generating means for generating a sawtooth signal having a period equal to the period of the trace of each head; means for combining the sawtooth signal with said first level signals when said first head scan said tape; and means for combining the sawtooth signal with said second level signals when said second head scans said tape; said combined sawtooth and first level signals being supplied as control signals to said first displaceable support means and said combined sawtooth and second level signals being supplied as control signals to said second displaceable support means.

21. The apparatus of claim 20 wherein said means for combining comprises change-over switch means coupled to said sawtooth signal generating means; and first and second adding means connected to said change-over switch means; said change-over switch means supplying said sawtooth signal only to said first adding means when said first head scans said tape to add said sawtooth and first level signals, and said change-over switch means supplying said sawtooth signal only to said second adding means when said second head scans said tape to add said sawtooth and second level signals.

22. The apparatus of claim 21 wherein said sawtooth signal generating means generates a sawtooth signal whose amplitude is determined by the tape speed and which commences when each head begins to scan said tape; and wherein said means for combining further comprises sampling means for sampling said sawtooth signal at the beginning of each head scan and for supplying the sampled sawtooth signal to said change-over switch means such that said sampled sawtooth signal is supplied to said second adding means by said change-over switch means when said sawtooth signal is supplied to said first adding means and said sampled sawtooth signal is supplied to said first adding means by said change-over switch means when said sawtooth signal is supplied to said second adding means.

23. The apparatus of claim 20 wherein said sawtooth signal generating means comprises frequency discriminating means connected to receive said tape speed pulses for producing an analog speed representing signal determined by the frequency of said tape speed pulses; means for providing a reference signal whose amplitude is equal to that of said analog speed representing signal when $N=1$; capacitance means; switch means connected between said means for providing a reference signal and said capacitance means and responsive to each sensing that a head has rotated into predetermined position with respect to said tape to apply said reference signal to said capacitance means so as to charge said capacitance means abruptly to the amplitude of said reference signal; and means for gradually discharging said capacitance means toward the amplitude of said analog speed representing signal when $N<1$ until the next response of said switch means, and for gradually charging said capacitance means toward the amplitude of said analog speed representing signal when $N>1$ until the next response of said switch means.

24. The apparatus of claim 23 wherein said means for gradually discharging and charging said capacitance means comprises transistor means whose base electrode is supplied with said analog speed representing signal and whose emitter electrode is coupled by resistance means to said capacitance means.

25. The apparatus of claim 20 further comprising tracking error detecting means for detecting the actual displacement error between the trace of each head and a record track being scanned thereby to produce a tracking error signal; and adjusting means coupled to said sawtooth signal generating means for adjusting the average level of each sawtooth signal with a signal corresponding to said displacement error.

26. The apparatus of claim 16 wherein said head position sensing means comprises position pulse generating means for generating first and second head position pulses when said first and second heads rotate into respective scanning relationship with said tape; and wherein said first and second level generating means comprise digital-to-analog conversion means coupled to said resettable counting means to convert the count thereof to a corresponding analog level, first sample-and-hold means coupled to said digital-to-analog conversion means and responsive to first sampling pulses to sample and temporarily store said analog level, second sample-and-hold means coupled to said digital-to-analog conversion means and responsive to second sampling pulses to sample and temporarily store said analog level, first monostable multivibrator means responsive to said first head position pulses to generate said first sampling pulses at a time delayed from said first head position pulses by substantially one-half of a trace period, and second monostable multivibrator means responsive to said second head position pulses to generate said second sampling pulses at a time delayed from said second head position pulses by substantially one-half of a trace period.

27. The apparatus of claim 16 further comprising closed loop head tracking control means, including oscillator means for generating an oscillating signal; means for supplying said oscillating signal to said first and second displaceable support means to vibrate said displaceable support means, and thus said first and second heads, transversely to the direction of said traces; envelope detecting means for detecting the amplitude modulated envelope of the video signal reproduced by said first and second heads, the amplitude modulation being caused by the vibration of said heads; synchronous detecting means supplied with said amplitude modulated envelope and with said oscillating signal to produce a tracking error signal representing the deviation of the average path traversed by each head from the record track being scanned thereby; and means for supplying said tracking error signal to said first and second displaceable support means, respectively, to deflect said displaceable support means in a manner to cancel said deviation.

28. The apparatus of claim 16 wherein said tape driving means comprises a capstan, a capstan motor mechanically coupled to said capstan, a servo circuit for controlling the operation of said capstan motor, and a pinch roller cooperative with said capstan to move said tape; and wherein said frequency generating means generates tape speed pulses as a function of the operating speed of said capstan motor.

29. The apparatus of claim 28 wherein said frequency generator is mechanically coupled to said capstan.

30. The apparatus of claim 28 wherein said head drive means includes a rotary shaft and a head drive motor for rotatably driving said rotary shaft, thereby to rotate said first and second displaceable support means; and wherein said head position sensing means comprises at least one sensible element mounted on said rotary shaft in predetermined relative position to at least one of said heads, and pick-up means fixedly disposed for sensing said at least one element to produce position pulses in response thereto.

31. The apparatus of claim 16 wherein each of said displaceable support means includes a piezo-ceramic member.

32. The apparatus of claim 31 wherein said piezo-ceramic member is a bi-morph leaf assembly.

* * * * *